(12) United States Patent
Fujinaka

(10) Patent No.: US 7,064,468 B2
(45) Date of Patent: Jun. 20, 2006

(54) BRUSH-LESS MOTOR USING VERNIER STRUCTURE

(75) Inventor: Hiroyasu Fujinaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 31 days.

(21) Appl. No.: 10/485,160

(22) PCT Filed: Aug. 5, 2002

(86) PCT No.: PCT/JP02/07954

§ 371 (c)(1),
(2), (4) Date: Jan. 29, 2004

(87) PCT Pub. No.: WO03/028192

PCT Pub. Date: Apr. 3, 2003

(65) Prior Publication Data

US 2004/0245887 A1     Dec. 9, 2004

(30) Foreign Application Priority Data

Aug. 8, 2001   (JP)   ............................. 2001-240841

(51) Int. Cl.
*H02K 1/12*     (2006.01)
*H02K 1/00*     (2006.01)
*H02K 21/12*    (2006.01)
*H02K 37/14*    (2006.01)

(52) U.S. Cl. ................. 310/216; 310/156.45; 310/254; 310/49 R

(58) Field of Classification Search ............. 310/67 R, 310/156.45, 216, 43, 44, 49 R, 154.11, 156.08, 310/156.53
See application file for complete search history.

(56) References Cited

U.S. PATENT DOCUMENTS

| 4,280,072 | A | * | 7/1981 | Gotou et al. ............... 310/67 R |
| 4,761,576 | A | * | 8/1988 | Savage ...................... 310/51 |
| 4,985,669 | A |   | 1/1991 | Smith |
| 5,030,864 | A | * | 7/1991 | Van Hout et al. ......... 310/67 R |
| 5,239,218 | A |   | 8/1993 | Hashimoto et al. |
| 5,289,064 | A |   | 2/1994 | Sakamoto |
| 5,386,161 | A |   | 1/1995 | Sakamoto |

(Continued)

FOREIGN PATENT DOCUMENTS

EP    0 252 011 A    1/1988

(Continued)

OTHER PUBLICATIONS

International Search Report for PCT Application No. PCT/JP 02/07954, mailed Mar. 17, 2003.

(Continued)

*Primary Examiner*—Karl Tamai
*Assistant Examiner*—Erik Preston
(74) *Attorney, Agent, or Firm*—RatnerPrestia

(57) ABSTRACT

A brush-less motor includes a rotor with a magnet alternately magnetized N pole and S pole in a rotating direction, and a core with plural salient poles on which coils are wound. The core faces the magnet to form a magnetic circuit. Each one of the salient poles are toothed and provided with small teeth at an edge facing the magnet. The small teeth have a pitch corresponding to two poles of the magnet. Powering to the coil responsive to a rotor position drives the rotor. This structure substantially increases volumetric efficiency of the motor.

9 Claims, 28 Drawing Sheets

U.S. PATENT DOCUMENTS

| | | |
|---|---|---|
| 5,532,531 A | 7/1996 | Sakamoto |
| 6,396,183 B1 * | 5/2002 | Tajima et al. .......... 310/156.53 |
| 6,432,158 B1 * | 8/2002 | Harada et al. ................. 75/245 |
| 6,700,247 B1 * | 3/2004 | Masuzawa et al. ........... 310/80 |
| 6,707,209 B1 * | 3/2004 | Crapo et al. ........... 310/156.43 |
| 6,856,051 B1 * | 2/2005 | Reiter et al. ................... 310/44 |
| 2002/0089249 A1 * | 7/2002 | Sato et al. ............. 310/156.43 |
| 2002/0119040 A1 * | 8/2002 | Bosley ........................ 415/72 |
| 2002/0125780 A1 * | 9/2002 | Shiratori ................ 310/156.21 |

FOREIGN PATENT DOCUMENTS

| | | |
|---|---|---|
| JP | 59-41167 A | 3/1984 |
| JP | 3-123258 A | 5/1991 |
| JP | 5-111233 A | 4/1993 |
| JP | 6-014514 | 1/1994 |
| JP | 7-116621 | 5/1995 |
| JP | 7-131968 | 6/1995 |
| JP | 10-80124 | 3/1998 |

OTHER PUBLICATIONS

"New Type 3-Phase Stepping Motor" by Masafumi Sakamoto et al., T.IEEE Japan, vol. 115-D, No. 2, '95, pp. 178-179 (w/full English translation).

* cited by examiner

|  | Fig.1 Vernier type | Fig.35 Conventional type | Fig.36 Conventional type |
| --- | --- | --- | --- |
| Effective magnetic fluxes φ | 0.8× | 1.0× | 0.4× |
| Coil turns t | 1.0× | 1.0× | 1.0× |
| Magnetic poles m | 20poles | 8poles | 20poles |
| salient poles z | 6poles | 6poles | 15poles |
| Coil resistance R | 1.25× | 1.0× | 4.0× |
| Volumetric efficiency η | 3.2× | 1.0× | 1.55× |

Aspect ration of manetic circuit (length/other diameter)

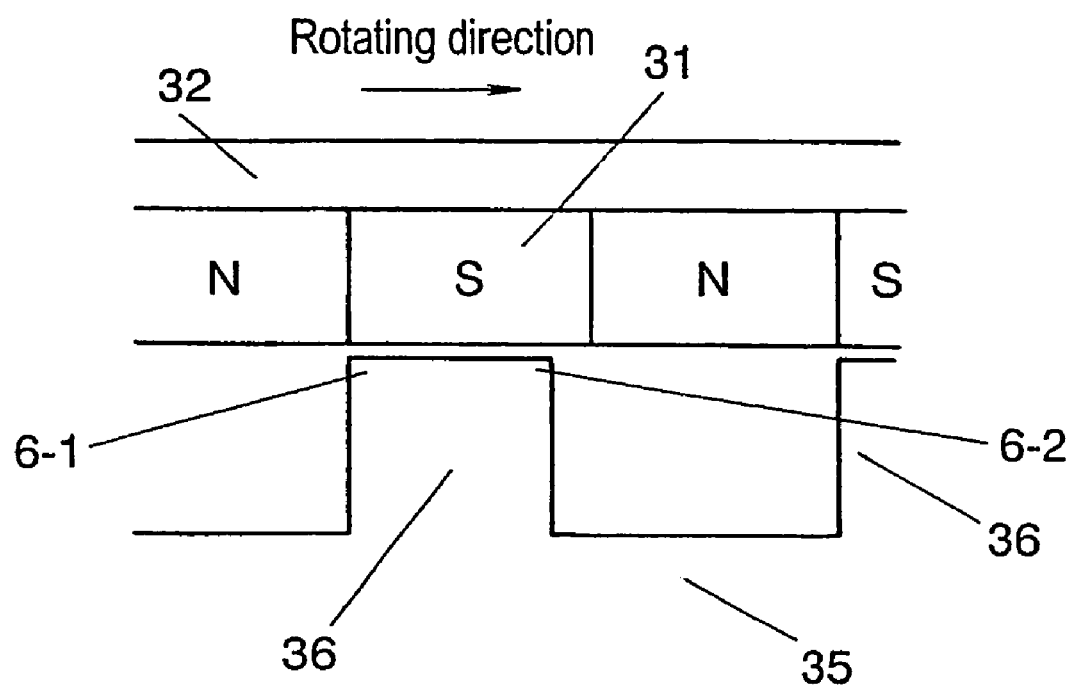

FIG. 28A
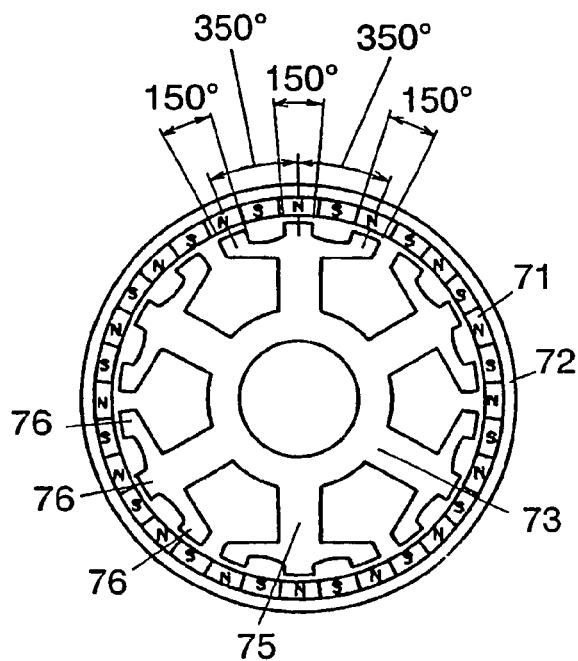
FIG. 28B
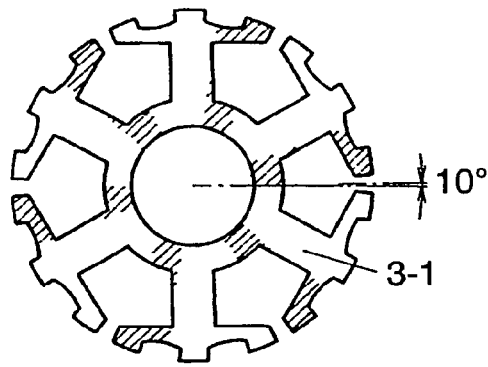
FIG. 28C    FIG. 28D
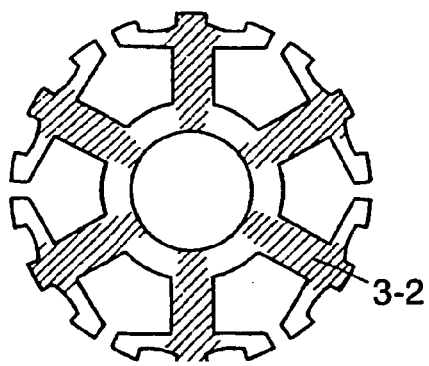   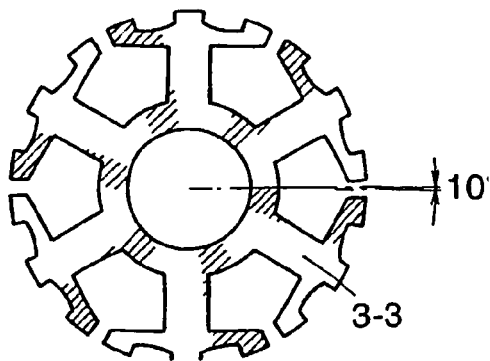

BRUSH-LESS MOTOR USING VERNIER STRUCTURE

This application is a U.S. national phase application of PCT international application PCT/JP02/07954.

TECHNICAL FIELD

The present invention relates to a motor to be used as a driving source of an apparatus, more particularly it relates to a brush-less motor of which stator employs a vernier structure.

BACKGROUND ART

Motors are employed as a driving source of various apparatuses such as video and audio apparatuses, office automation apparatuses, home appliances, transporting devices, factory automation devices. These apparatuses and devices have been equipped with more functions year by year, thus a number of motors employed in these apparatuses and devices has increased accordingly. At the same time, the apparatuses and devices have been downsized and done their jobs at a higher speed. The market therefore has requested that motors output a greater power with a smaller body.

Various types of motors are used, such as an induction motor, a dc motor with a brush, a stepping motor, and a brush-less motor. The present invention relates to the brush-less motor.

FIG. 31A and FIG. 31B show a first example, i.e., a conventional brush-less motor. In FIG. 31A, a stator comprises core 103 and coils 104 wound on salient poles of core 103. A rotor comprises magnets 101 and shaft 112 to which magnets 101 are mounted. Core 103 faces magnets 101 with a predetermined space inbetween. Both the ends of shaft 112 are journalled by bearings 113.

In FIG. 31B, magnets 101 are magnetized to form eight poles. Core 103 facing magnets 101 has six salient poles uniformly spaced and wound with coils 104. Adjacent salient poles have a phase difference of 120 degrees in electrical angles. Salient poles 105-1 and 105-4, both being in the same phase, are assigned to phase U, salient poles 105-2, 105-5 also in the same phase are assigned to phase V, and salient poles 105-3, 105-6 in phase are assigned to phase W Coils 104 wound on each salient pole, namely phase U coil, phase V coil and phase W coil, are powered and controlled detecting a rotor position, so that the rotor is driven.

As shown in this first example of the conventional brush-less motor, edges of respective salient poles are flat in general.

On the other hand, a motor in which an edge of each one of salient poles is toothed, i.e., plural small teeth are provided at the edge of a pole (vernier structure), is available as a hybrid (HB type) stepping motor, and this HB type motor is commercialized and provided to general uses.

A stepping motor of HB type generally used is described hereinafter. FIG. 32A and FIG. 32B show a structure of a second example, i.e., a conventional HB type stepping motor. In both the Figs., magnet 201 is magnetized two poles (N and S poles) along a rotary shaft. Rotor iron-core 211 is magnetized N pole or S pole at an entire upper side or an entire lower side. An outer wall of rotor iron core 211 is toothed with a uniform pitch and thus small teeth are provided to the outer wall. The position of the small teeth of the upper rotor iron-core is shifted from that of the lower iron-core in angles such that the peaks the teeth of the upper one correspond to the valleys of the teeth of the lower one.

A stator comprises stator core 203 and coils 204 wound on the salient poles of core 203. A rotor comprises magnet 201, upper and lower rotor iron-cores 211, and shaft 212 extending through magnet 201. Stator core 203 faces rotor iron-core 211 with a given space. Both the ends of shaft 212 are journalled by bearings 213.

In FIG. 32B, plural salient poles 205 provided on inner wall of stator core 203 are also toothed at the same pitch as rotor iron-core 211. These salient poles 205 are shifted given angles with respect to the small teeth provided to the outer wall of rotor iron-cores 211 of each phase. Powering the coils wound on the respective salient poles magnetizes small teeth on the powered salient poles. Thus the small teeth on the salient poles attract and repulse another small teeth, magnetized by magnet 201, on rotor iron-core, so that torque is generated for trying to fix the rotor at a given position. In this status, powering a phase of the coils is sequentially changed, thereby driving the rotor.

A smaller angular pitch of toothing rotor iron-core 211 and stator core 203 reduces a rotating angle of the rotor per phase change, so that a positioning at a finer angular pitch can be expected. As such, the stator and the rotor are toothed with fine pitches respectively, thereby increasing an angular resolution of an output shaft of the motor. As a result, a positioning at a fine pitch can be realized.

An inspiration from a stepping motor of the same type as discussed above has replaced an assembly of a toothed rotor iron-core and a magnet magnetized two poles along a shaft with a cylindrical magnet magnetized multi-poles. This idea has been developed to stepping motors with permanent magnets, and those motors are disclosed in Japanese Patent Gazette Nos. 3140814, 3071064, and 2740893. This idea has been also developed to a magnet rotary machine in Japanese Patent Application H10-80124 and to a two-phase motor with permanent magnets and disclosed in Japanese Patent Gazette No. 2733824. A three-phase stepping motor is one of the products developed from this idea and disclosed in Japanese Electric Academy Research Papers, section D, volume 115, second issue, published in 1995.

FIG. 33A and FIG. 33B show the rotor structure of a motor (a third example of conventional motors) similar to the three-phase stepping motor discussed above. FIG. 34 shows the rotor structure (a fourth example of conventional motors) described in the foregoing research papers.

This paper tells that the rotor structure shown in FIG. 33A and FIG. 33B produces the following advantages: (1) Magnetic flux distribution approximates to a sine wave. (2) An axial length of a magnetic pole can be extended as long as twice. (3) A magnetic path becomes two dimensional one, so that smaller magnetic resistance is produced. Those advantages make the motor shown in FIG. 33A and FIG. 33B produce an equivalent output to that of the motor shown in FIG. 34, and yet produces more accurate intermediate positioning in angles, i.e., where micro-stepping is activated, than the motor shown in FIG. 34.

On the other hand, there have been only few cases where the vernier structure is applied to brush-less motors. However, various techniques have been developed to enhance the performance of the brush-less motor, e.g., improving the performance of magnets, developing a low-loss material of the iron-core, improving a space factor of the windings for reducing copper loss. Recently a high-performance rare-earth oriented magnet formed of Neodymium-Iron-Boron (Nd—Fe—B) or Sm—Fe—N has been developed. The use of this magnet makes the iron-core become magnetically saturated because a saturation magnetic flux density of the iron core is low with respect to such a high performance magnet having more an improved magnetic flux density. As a result, the motor cannot use fully enough the improved performance of the magnet, so that the motor per se improves its performance only to some extent.

The prior art previously discussed has been developed for stepping motors in mind, and the vernier structure contributes mainly to an improvement of an angular resolution. This prior art is thus not optimized for an output density representing an output per unit volume, or volumetric efficiency representing how much a motor can be downsized maintaining its characteristics, so that this prior art, as it is, cannot apply to brush-less motor.

Further, a stepping motor needs always a constant current because of its current-carrying method, while a brush-less motor does not carry a current in a phase coil which produces no torque. Therefore, in general, the current-carrying method of the stepping motor has lower efficiency than that of the brush-less motor in operation.

What is more, the stepping motor is good at positioning control but is poor at torque control. A brush-less motor capable of torque control is thus employed for torque control in general.

SUMMARY OF THE INVENTION

The present invention addresses the problems discussed above, and aims to provide a highly efficient brush-less motor that employs a vernier structure as the foregoing stepping motor. The vernier structure is optimized for the brush-less motor so that a breakthrough of the limit of the volumetric efficiency of conventional brush-less motors can be achieved for obtaining a brush-less motor that produces a greater output maintaining the same size.

The brush-less motor of the present invention comprises the following elements:

(a) a rotor having a magnet alternately magnetized N and S poles in a rotating direction; and (b) a core having plural salient poles, on which coils are wound, facing the magnet in a radial direction.

An opposite section of each one of the salient poles is toothed at a pitch substantially same as two poles of the magnet, so that small teeth are formed. A coil is selectively powered responsive to a rotor position, thereby driving the rotor.

Small teeth provided on the edge of each salient pole result in selectively taking magnetic flux of magnetic poles facing the small teeth into the salient pole. Therefore, increasing a number of small teeth instead of increasing a number of salient poles restrains a number of effective magnetic fluxes from decreasing, and a number of magnetic poles can be increased arbitrarily, which improves the volumetric efficiency of the motor. As a result, a motor can be downsized maintaining the same characteristics, or a motor can increase its output maintaining the same size.

BRIEF DESCRIPTION OF THE DRAWINGS

FIG. 15 is a schematic view illustrating how the cogging torque occurs at the small teeth in accordance with the third embodiment.

FIG. 28A through FIG. 28D are schematic views of core shapes of a brush-less motor in accordance with a seventh exemplary embodiment of the present invention.

DETAILED DESCRIPTION OF THE PREFERRED EMBODIMENTS

Exemplary embodiment of the present invention are demonstrated hereinafter with reference to the accompanying drawings.

Exemplary Embodiment 1

Figures 1, 2:
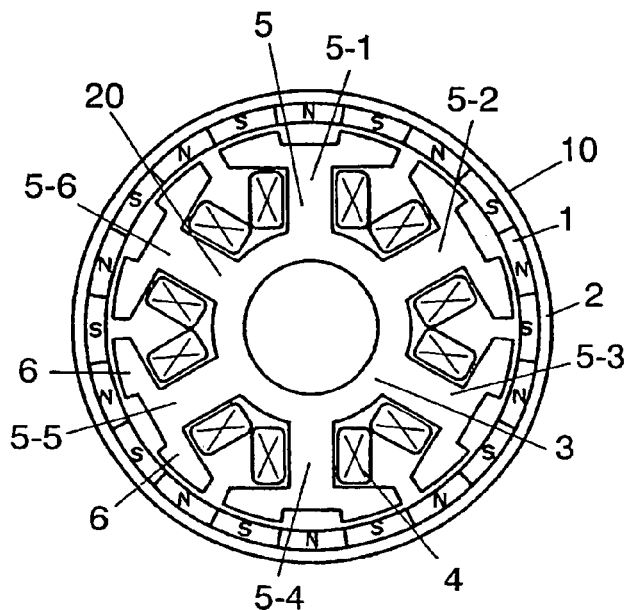
FIG. 1 is a schematic view illustrating a structure of a magnetic circuit of a brush-less motor in accordance with a first exemplary embodiment of the present invention.
FIG. 2 is a comparison table comparing the brush-less motor of the first embodiment with a conventional brush-less motor (a fifth and a sixth examples of conventional brush-less motors.)

FIG. 1 is a schematic view illustrating a structure of a magnetic circuit of a brush-less motor in accordance with the first embodiment of the present invention. In FIG. 1, cylindrical magnet 1 is magnetized N and S poles alternately and uniformly at its inner wall to form 20 poles in total. Back yoke 2 is fixed to an outer wall of magnet 1. Core 3 is made of silicon steel plates that has been punched by press and laminated axially. Core 3 includes six salient poles 5 (poles 5-1 through 5-6) equi-spaced from each other. Coils 4 are wound on each salient pole 5. Each salient pole 5 is toothed and has two small teeth 6 at its edges facing magnet 1, so that 12 small teeth 6 in total are formed with a pitch which corresponds to two poles (N and S poles, i.e., 360 degrees in electrical angles) of magnet 1.

An innovative feature of this first embodiment is the two small teeth provided to an edge of each salient pole with a pitch corresponding to two poles of the magnet. These small teeth allows each salient pole to selectively take in magnetic flux from the poles facing the small teeth.

In the foregoing structure, salient poles 5-1 and 5-4 (phase U), salient poles 5-2 and 5—5 (phase V), and salient poles 5-3 and 5-6 (phase W) are respectively in the same phase positions. The respective phases of those three groups differ from each other in electrical angles of 120 degrees. Each group is assigned to one phase as described above, and three-phase power is supplied to coils 4 responsive to a rotational position of rotor 10 to which magnet 1 is fixed. As a result, torque is produced and rotor 10 is driven.

Figure 35:
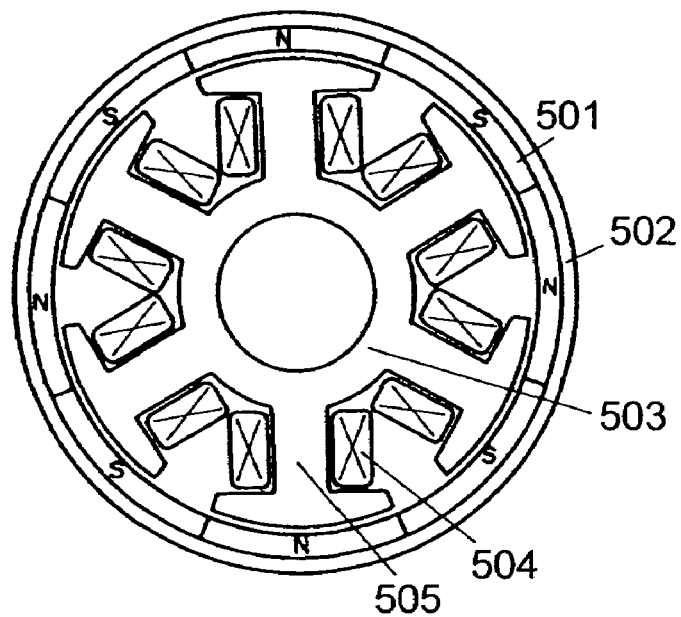
FIG. 35 is a schematic view illustrating a structure of a magnetic circuit of a brush-less motor in accordance with a fifth conventional example.

The brush-less motor in accordance with the first embodiment is compared with a conventional brush-less motor in the same size. FIG. 35 illustrates a magnetic circuit of a fifth conventional example of brush-less motors, and FIG. 36 shows a magnetic circuit of a sixth conventional example.

In FIG. 35, cylindrical magnet 501 is magnetized N and S poles alternately and uniformly at its inner wall to form eight poles in total. Back yoke 502 is fixed to an outer wall of magnet 501. Core 503 includes six salient poles 505 equi-spaced from each other, and coils 504 are wound on poles 505. Thus the brush-less motor of the fifth conventional example has six salient poles which equals to that of the first embodiment shown in FIG. 1; however, magnet 501 is magnetized 8 poles which differs from 20 poles of the first embodiment.

In the conventional brush-less motor shown in FIG. 35, if the magnet is magnetized more numbers of poles with the shape of the salient pole kept as it is, the edge width of each salient pole becomes wider than a corresponding magnet pole. Magnetic flux from the pole thus loops at the edge of the salient pole, thereby reducing effective magnetic flux that contributes to producing torque. As a result, the motor outputs substantially less power. This proves that an increase of a number of poles should accompany an increase of a number of salient poles.

Figure 36:
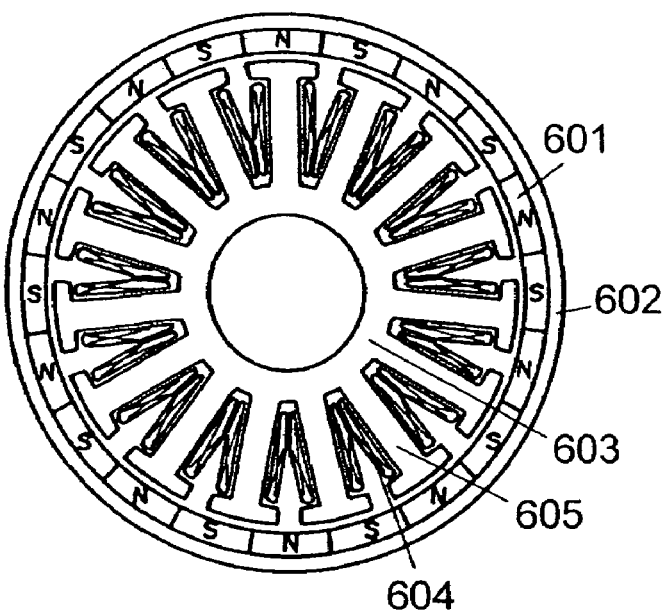
FIG. 36 is a schematic view illustrating a structure of a magnetic circuit of a brush-less motor in accordance with a sixth conventional example.

In the sixth conventional example shown in FIG. 36, the magnet of the brush-less motor shown in FIG. 35 is magnetized more numbers of poles with a ratio of a number of poles vs. a number of salient poles (4:3) kept as it is. In FIG. 36, cylindrical magnet 601 is magnetized N and S poles alternately and uniformly at its inner wall to form 20 poles in total. Back yoke 602 is fixed to an outer wall of magnet 601. Core 603 includes 15 salient poles 605 equi-spaced from each other, and coils 604 are wound on poles 605. Thus the brush-less motor of the sixth conventional example has 15 salient poles which differs from that of the first embodiment shown in FIG. 1; however, magnet 601 is magnetized 20 poles which equals to that of the first embodiment.

As such, a number of salient poles is increased by providing small teeth to the edges of the salient poles as demonstrated in this first embodiment illustrated in FIG. 1, i.e., the vernier structure is employed in the brush-less motor. However, regarding the sixth conventional example shown in FIG. 36, instead of increasing a number of the salient poles, a number of poles can be increased by increasing a number of small teeth.

Characteristics of the brush-less motor of the first embodiment shown in FIG. 1, and the conventional brush-less motors shown in FIG. 35 and FIG. 36 are compared with each other hereinafter.

First, a volumetric efficiency of the motor is considered. A reciprocal of a speed variation rate of a motor is often used as a volumetric efficiency. The volumetric efficiency $\eta$ is expressed by the following equation:

$$\eta = 1/\mu \propto (\Phi \times t \times m \times z)^2 / R$$

where
"$\mu$" is a speed variation rate;
"$R$" is a phase resistance between phases of the motor;
"$\Phi$" is a number of effective magnetic fluxes per salient pole;
"$t$" is a number of coil turns;
"$m$" is a number of rotor's poles; and
"$z$" is a number of core's salient poles.

The magnetic circuit of the brush-less motor in accordance with the first embodiment and those of the conventional brush-less motors shown in FIG. 35 and FIG. 36 are applied to the equation discussed above for comparison. FIG. 2 shows a comparison table where the three motors, i.e., the one of the first embodiment, and the two of conventional examples, and the respective parameters are calculated assuming those of the conventional brush-less motor shown in FIG. 35 are "1".

First, regarding the number of effective magnetic fluxes "$\Phi$", the conventional structure shown in FIG. 35 includes the salient poles each of which has a greater area facing magnetic poles than that of the first embodiment. Thus the conventional structure has a larger number of effective magnetic fluxes. In the case of the first embodiment, each of the salient poles has the smaller area facing magnetic poles than that of the conventional one shown in FIG. 35, and thus has effective magnetic fluxes as small as 0.8 times of the conventional one shown in FIG. 35 neglecting leakage fluxes or ineffective magnetic fluxes. In the case of the conventional structure shown in FIG. 36, a number of effective magnetic fluxes per salient pole lowers to as small as 0.4 times of the conventional one shown in FIG. 35 because of increasing a number of salient poles.

Second, regarding the number of coil-turns "$t$", the three cases shown in the table of FIG. 2 have the same number of turns. Regarding the number of rotor magnetic poles "$m$", the conventional one shown in FIG. 35 has eight magnetic poles, while the conventional one shown in FIG. 36 as well as the motor of the first embodiment has 20 poles. The latter two have as many as 2.5 times of the one shown in FIG. 35.

Third, regarding the number of salient poles "$z$", the motor of the first embodiment has six salient poles equivalent to the conventional one shown in FIG. 35, and another conventional one shown in FIG. 36 has 15 poles.

Next, regarding coil resistance "$R$" between phases, the structure of the first embodiment shown in FIG. 1 has a larger edge of the salient pole than that of the conventional one shown in FIG. 35. Thus a space for winding becomes smaller, which requires a smaller-diameter wire to obtain the same number of turns. As a result, a coil resistance increases. In the case of the first embodiment, the coil resistance increases by approx. 1.25 times. The conventional structure shown in FIG. 36 has a greater number of salient poles than others, so that a number of coils connected in series increases and a space between the adjacent salient poles decreases, what is more, a space for winding a coil decreases and resistance per coil increases. As a result, the coil resistance of the conventional one shown in FIG. 36 increases as much as approx. 4 times of the conventional one shown in FIG. 35.

Applying those numbers discussed above to the foregoing equation proves that volumetric efficiency $\eta$ of the brush-less motor of the first embodiment becomes theoretically 3.2 times and 2 times of the conventional ones shown in FIG. 35 and FIG. 36 respectively. Indeed, increasing a number of poles "$m$" in the conventional brush-less motor improves a volumetric efficiency to some extent; however, coil resistance "$R$" extensively increases, and as a result, the volumetric efficiency cannot be remarkably improved.

On the other hand, in the case of the brush-less motor in accordance with the first embodiment where the vernier structure is employed, the number of poles "$m$" can be increased with only a moderate increase of coil resistance "$R$". As a result, the volumetric efficiency can be substantially improved, though a number of effective magnetic fluxes "$\Phi$" somewhat lowers.

So far the brush-less motor of the first embodiment where the vernier structure is employed can obtain a volumetric efficiency as much as two times of the conventional ones in theory. However, some conditions are involved to make full use of the volumetric efficiency of this brush-less motor employing the vernier structure.

First, the number of effective magnetic fluxes "$\Phi$" does not work mathematically, to be more specific, the number of effective magnetic fluxes "$\Phi$" of the vernier-type brush-less motor is mathematically 0.8 times of the conventional one shown in FIG. 35; however, actually it becomes less than 0.8 times.

Here is why the less numbers in actual: In general, an average magnetic flux density of a magnet decreases at more numbers of magnetized poles. Because the vicinity of a border between different poles cannot be perfectly magnetized. In other words, non-magnetized parts and poorly magnetized parts exist at the vicinity. Therefore, an average magnetic flux density of the magnet of the vernier-type brush-less motor becomes lower than that of the conventional one shown in FIG. 35.

The vernier-type magnetic circuit shown in FIG. 1 generates numbers of non-effective magnetic fluxes that do not contribute to torque production.

Figure 3:
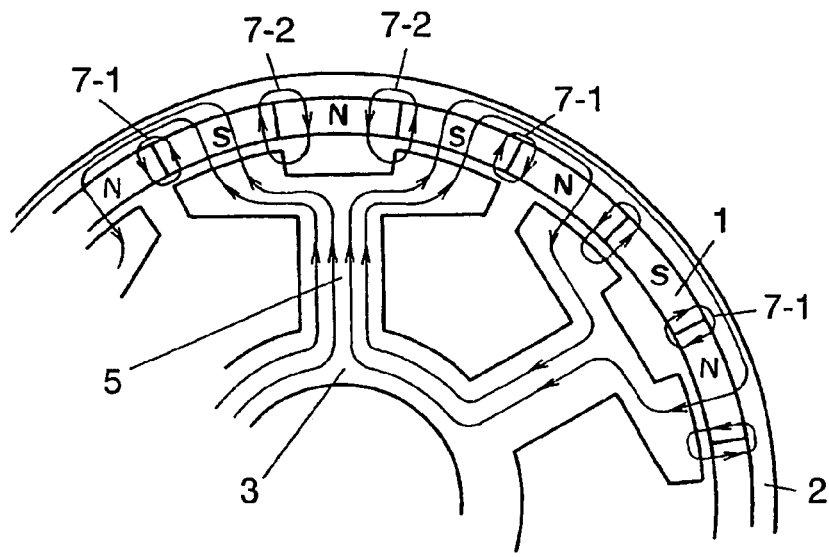
FIG. 3 is a schematic view illustrating flows of magnetic flux in the brush-less motor in accordance with the first embodiment.

FIG. 3 illustrates flows of the magnetic flux in the brush-less motor in accordance with the first embodiment of the present invention. In FIG. 3, arrow marks show the flows of the magnetic flux. The magnetic flux that can contribute to torque production enters into a magnetic pole, e.g., S pole of the magnet, from salient pole 5, and travels through back yoke 2 and the other magnetic pole, e.g., N pole, then returns to another salient pole 5. However, as shown in FIG. 3, there are numbers of magnetic fluxes such as magnetic flux 7-1 looping between adjacent N and S poles and leakage flux 7-2 that anyway travels through a part (a corner of salient pole 5) of core 3.

Lowering of the average magnetic flux density and non-effective magnetic fluxes discussed above further reduce the calculated factor, i.e., 0.8 times of a number of effective magnetic flux "Φ", down to actually approx. a half of the conventional one. The advantage of the structure employed in the first embodiment is thus lowered in the aspect of the volumetric efficiency.

Figure 4:
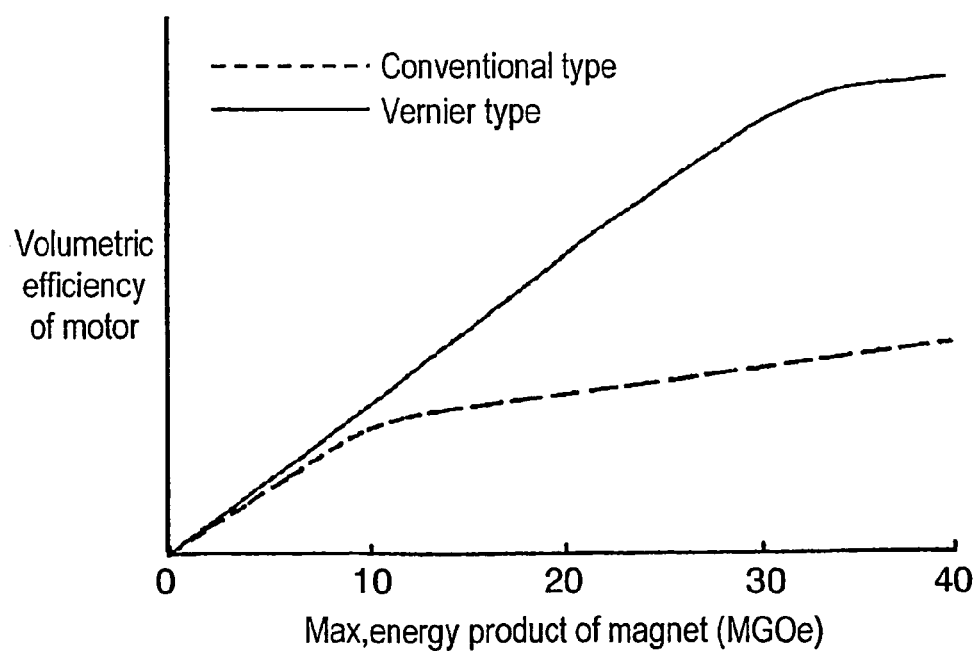
FIG. 4 is a graph showing a relation between a maximum energy product and a volumetric efficiency of a magnet in accordance with the first embodiment.

Then improvement of the magnet performance has been studied. FIG. 4 illustrates a relation of a max. energy product of magnet vs. a volumetric efficiency of the vernier-type brush-less motor of the first embodiment and the conventional one.

In FIG. 4, the lateral axis represents a maximum energy product (MGOe) that indicates performances of a magnet. In the case of the conventional brush-less motor, a motor having a low-performance magnet can increase its volumetric efficiency almost linearly with the better performance of the magnet. Around MGOe=10, the increase becomes slow-down, and no more increase can be expected over MGOe=15. This is because the silicon steel plates used in the core have a saturated magnetic density of 1.6–2.0 (T), which does not make allowance for the magnetic flux density produced by a magnet having improved performance. Thus a thickness of the magnet is extremely reduced, and a flux density at an operating point should be suppressed. As a result, even if the performance of the magnet has been improved, the volumetric efficiency cannot be increased except the volume becomes slightly smaller due to thinning of the magnet. The maximum energy product now available reaches as much as 45–50 MGOe in an Nd—Fe—B oriented sintered magnet; however, the conventional brush-less motors cannot make full use of this magnet. In actual, some of the conventional brush-less motors employ an Nd—Fe—B oriented resin magnet having approx. 10 MGOe, in general, because the cost is another critical factor.

On the other hand, in the case of the brush-less motor employing the vernier structure, its number of effective magnetic fluxes decreases as low as approx. a half of the conventional one. Because the average flux density is lowered by increasing a number of magnetized poles and non-effective fluxes are produced. Thus the core has still enough room of the flux density before it is saturated. Therefore, increasing the flux density of the magnet by improving the performance of the magnet can substantially improve the volumetric efficiency.

As shown in FIG. 4, in the region over MGOe=10, the vernier-type brush-less motor in accordance with the first embodiment has advantageously a higher volumetric efficiency than the conventional one.

Figure 5:
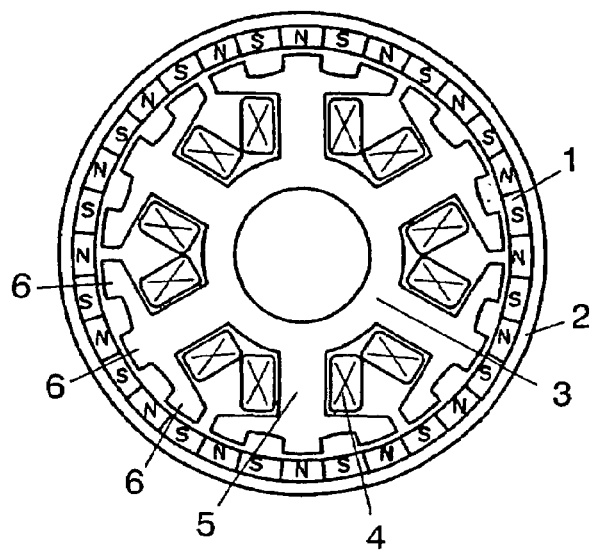
FIG. 5 is a schematic view illustrating a structure of a magnetic circuit of another brush-less motor in accordance with the first exemplary embodiment.

FIG. 5 shows a structure of a magnetic circuit of another brush-less motor in accordance with the first embodiment of the present invention. In FIG. 5, similar elements to those in FIG. 1 have the same reference marks, and the descriptions thereof are omitted here.

In the first embodiment shown in FIG. 1, two small teeth 6 are provided to each salient pole of core 3, and if the performance of the magnet improves over a certain level, the core could be magnetically saturated. In such a case, a number of small teeth is increased to three or more than three, so that the volumetric efficiency can be further increased proportionately with the improvement of magnet performance.

Another condition to make full use of volumetric efficiency of the vernier-type brush-less motor is to adequately set a number of salient poles and that of magnetic poles. In the case of the first embodiment shown in FIG. 1, six salient poles and 20 magnetic poles of the rotor magnet are used.

In the case of three-phase brush-less motors, the following parameters are set so that the equation below can be satisfied:

$$P=(2n-\tfrac{2}{3})z$$

where
"p" represents a number of poles of the magnet;
"z" represents a number of salient poles of the core; and
"n" represents a number of small teeth.

Then a space between adjacent salient poles is minimized, so that a facing area between the small teeth on an edge of a salient pole and the magnet is maximized. This status maximizes a number of effective magnetic fluxes of the magnet, and makes full use of magnet's capacity. As a result, the volumetric efficiency of the motor can be improved.

The first embodiment shown in FIG. 1 uses the motor of which core has six salient poles and rotor has 20 magnetic poles; however, three salient poles and ten magnetic poles, nine salient poles and 30 magnetic poles, or 12 salient poles and 40 magnetic poles can be used.

Figure 6:
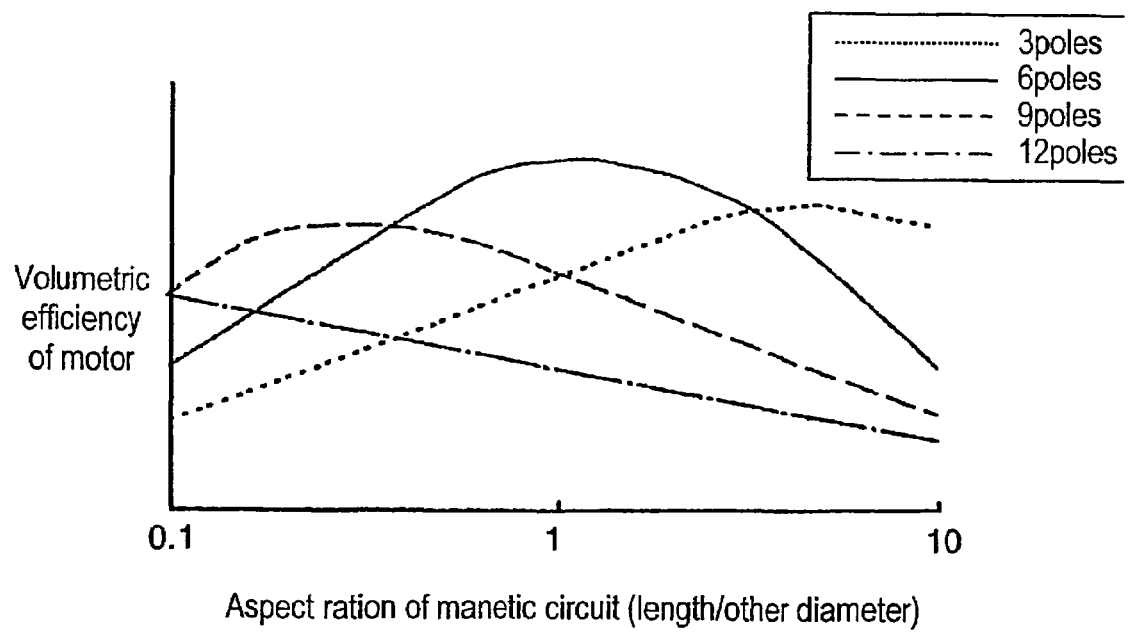
FIG. 6 is a graph showing a relation between an aspect ratio and a volumetric efficiency of the motor in accordance with the first embodiment.

FIG. 6 shows relations between aspect ratios (length/outer diameter) of magnetic circuits and volumetric efficiencies in brush-less motors having different numbers of salient poles. As shown in FIG. 6, the case of six salient poles exhibits the highest volumetric efficiency; however, in the case of smaller aspect ratio, i.e., thinner in the shaft direction, nine salient poles or 12 salient poles tend to show the better volumetric efficiency. On the contrary, in the case of a larger aspect ratio, i.e., longer in the shaft direction, three salient poles show a better volumetric efficiency.

This is because a height of coil stuck out (coil end) from the core is not negligible, and thus more numbers of salient poles are suitable for thinning the motor. However within a practical aspect ratio ranging from 0.1 to 3, six or nine salient poles show the best volumetric efficiency, therefore, selecting six or nine poles is generally proper.

Further, to make full use of the volumetric efficiency of a vernier-type brush-less motor, the performance of back yoke 2 is an important factor. As shown in FIG. 3, substantially great magnetic fluxes travel through back yoke 2, and the amount of the flux is different greatly depending on places. This is because the magnetic flux traveling through back yoke 2 is vigorously changed by rotor's rotation.

Particularly in this first embodiment, a number of magnetic poles is increased from conventional eight poles to 20 poles, so that the frequency of the magnetic flux is increased. As a result, eddy-current loss that increases proportionately with the square of the flux frequency as well as hysteresis loss that increases proportionately with the flux frequency become greater than those of the conventional one.

Figure 7:
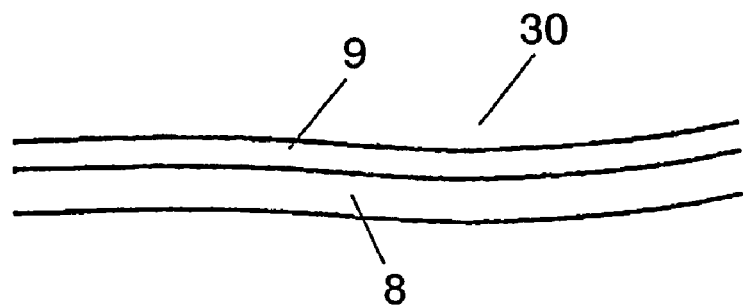
FIG. 7 shows a layered structure of a magnet in accordance with the first embodiment.

Accordingly, the following method is suitable for constructing the back yoke: Laminate silicon-steel plates in the axial direction. Then solidify the powder of insulated soft magnetic material with an insulated material such as resin. Another way is this: As shown in FIG. 7, a portion corresponding to magnet 1 and back yoke 2 shown in FIG. 1 is formed of a magnetic body having two layers, i.e., permanent-magnet layer 8 and back-yoke layer 9. Permanent-magnet layer 8 is made by solidifying highly coercive magnetic powder with resin, and back yoke layer 9 is made by solidifying highly permeable magnetic powder with resin. Those method increase high-frequency magnetic characteristics of the back yoke, so that the loss at the back yoke can be suppressed and the characteristics can be improved.

When the silicon steel plate is used for the back yoke, silicon content is desirably 2–6.5% mass ratio (6.5% is preferable.) Iron loss of the silicon steel plate is minimized when silicon content is 6.5% mass ratio, which allows efficient performance. As the contain of silicon increases, the steel plate becomes fragile and poor to be worked. An appropriate value ranging from 2 to 6.5% is desirably selected to consider easiness of working, so that easiness of working and improvement of efficiency can be compatible.

Figure 8:
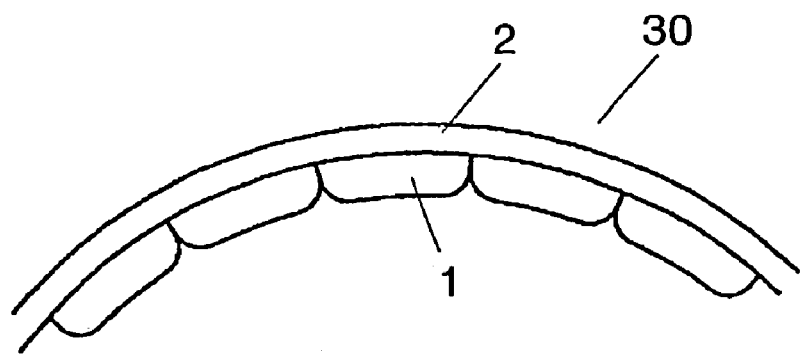
FIG. 8 shows a structure using bonded magnets in accordance with the first embodiment.
Figure 9:
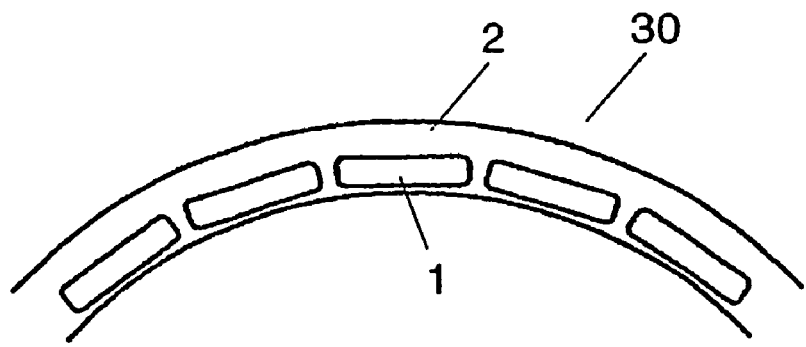
FIG. 9 shows a structure using interior magnets in accordance with the first embodiment.

Further, in this embodiment, a cylindrical magnet is demonstrated; however, as shown in FIG. 8, plural magnets 1 can be arranged and fixed on an inner wall of back yoke 2. Another way is shown in FIG. 9, i.e., back yoke 2 is formed by laminating silicon steel plates axially, and pieces of magnet are inserted into holes punched in advance. This is called an interior magnet structure. As such, a magnet is divided into plural pieces, and those pieces have been magnetized before they are assembled. This method allows easy magnetization and makes full use of capacity of the magnet with ease.

A magnet can be molded into a semi-cylindrical shape as shown in FIG. 8, so that influence between adjacent poles can be suppressed and an effective magnetic flux density can be increased. Pieces of magnet are buried in the yoke as shown in FIG. 9, so that the rotor can be mechanically strengthened.

Figure 10:
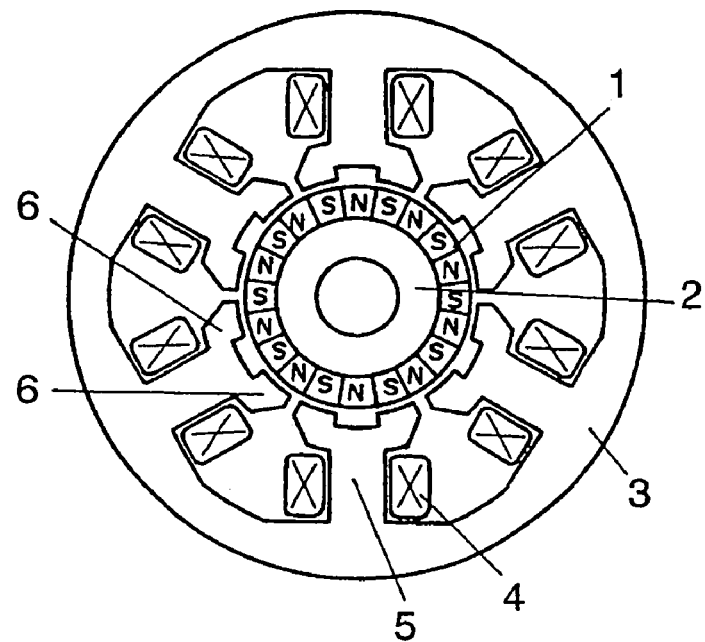
FIG. 10 is a schematic view illustrating a structure of a magnetic circuit of a brush-less motor having an inner-rotor structure in accordance with the first exemplary embodiment.

The first embodiment discussed above demonstrates an outer-rotor motor, in which a core is placed inside and a rotor is placed outside the core. However, an inner-rotor motor, in which the core is placed outside and the rotor is placed inside the core as shown in FIG. 10, can be applicable to this first embodiment. In general, in the case of a torque-oriented motor, the outer rotor motor is preferable because a facing area between the magnet and the core can be greater; on the other hand, in the case of a quick-response oriented motor, the inner rotor motor is preferred because the outer diameter of the rotor is small and the inertia moment of the rotor is also small. An appropriate selection can be made depending on an application.

The cogging torque involved in motors is generated by periodical changes of the magnetic energy between the core and the magnet when the rotor rotates. In the case of the vernier-type brush-less motor, greater cogging torque can be produced because a smaller rotating angle generates greater changes of magnetic energy than a conventional brush-less motor since a number of magnetic poles is increased.

The following embodiments (second through seventh) exhibit solutions of the cogging torque posed as a problem of the vernier-type brush-less motor in accordance with this first embodiment.

Exemplary Embodiment 2

Figure 11:
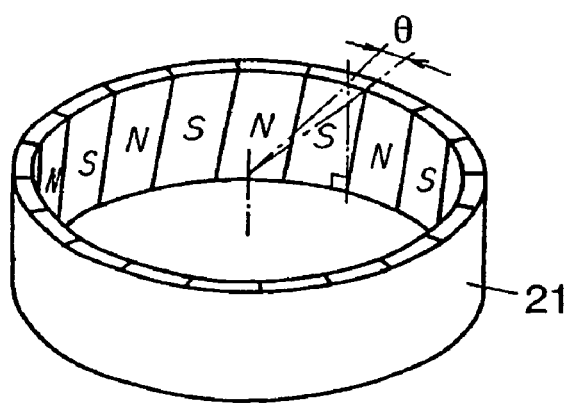
FIG. 11 shows magnetizing distribution of a magnet of a brush-less motor in accordance with a second exemplary embodiment of the present invention.

FIG. 11 shows magnetizing distribution of a magnet of a brush-less motor in accordance with the second exemplary embodiment of the present invention. Other magnetic circuit structures of the brush-less motor used in the second embodiment stay the same as those of the first embodiment shown in FIG. 1. In FIG. 11, magnet 21 is magnetized in predetermined skewed angle θ so that pole positions are different at an upper end and a lower end, where angle θ is a mechanical angle viewed from the rotation center and called a central angle.

In the case of a brush-less motor having a vernier-structure, "p"=a number of magnetic poles of the magnet, "z"=a number of salient poles of the core, then a waveform of cogging torque repeats "k" times per rotation, where "k" is the least common multiple of "p" and "z".

Skew-magnetization of the magnet averages the waveforms of cogging toque in a laminated direction, so that an absolute value of the cogging torque becomes smaller.

Figure 12A:
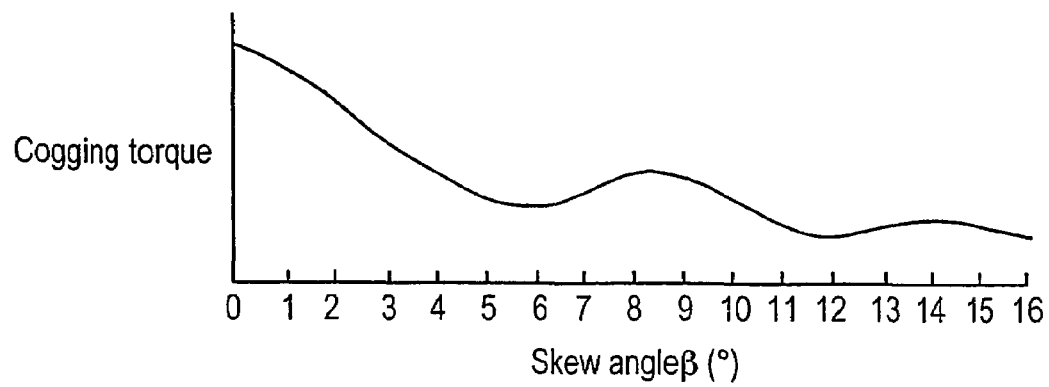
FIG. 12A is a graph showing a relation between magnetizing skew angle and cogging torque in accordance with the second embodiment.
Figure 12B:
FIG. 12B is a graph showing a relation between magnetizing skew angle and a volumetric efficiency of the motor in accordance with the second embodiment.

FIG. 12A shows a relation between skew-angles in magnetization and coggong torque. FIG. 12B shows a relation between skew-angles in magnetization and volumetric efficiency of the motor. As shown in FIG. 12A, the cogging torque tends to be smaller with an increase of the skew-angle, and takes a minimum value at around skew-angles of 6 and 12 degrees, while it takes slightly higher values at the other angles. Because skewed magnetization averages the waveform of cogging torque in the laminated direction of the core, the skew-angle is set to agree with an integral multiple of a cycle of cogging torque, whereby the cogging torque is minimized.

As shown in FIG. 12B, the volumetric efficiency of a motor tends to lower with an increase of the skew-angle. Because as the skew-angle becomes larger, pole phases differ from each other at the upper end and the lower end of the magnet, therefore, the coil is powered in a deviated powering-phase from a proper powering-phase. As a result, the volumetric efficiency of the motor is lowered.

The above discussion proves that skew-angle θ is preferably set at 6 degrees that corresponds to one cycle of cogging torque so that a reduction of cogging torque can be compatible with an improvement of the volumetric efficiency. In the case of an axial length of a magnet being equivalent to an axial length of the core, skew-angle θ is set to agree with a cycle of cogging torque as discussed above; however, when those two axial lengths are different, a slight change in the skew-angle sometime reduces the cogging torque.

The compatibility of the cogging torque reduction with the volumetric efficiency improvement becomes valid when the following equation is satisfied:

$$\theta = (360/k) \pm 10\%$$

where

"k"=the least common multiple of "p" and "z";

"p"=a number of magnetic poles of a magnet; and

"z"=a number of salient poles of a core.

Exemplary Embodiment 3

Figure 13:
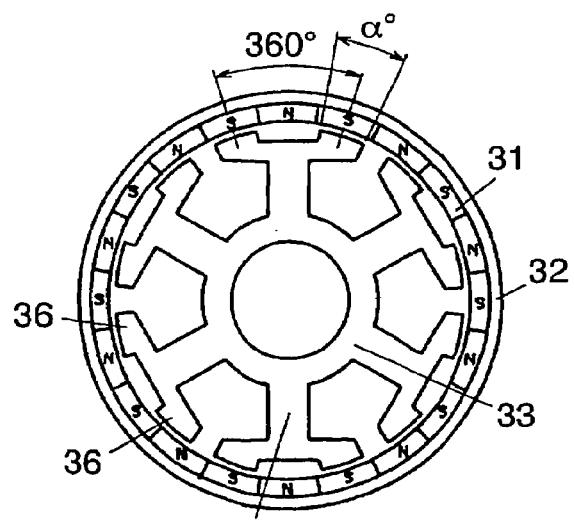
FIG. 13 is a schematic view illustrating a shape of a core of a brush-less motor in accordance with a third exemplary embodiment of the present invention.

In the second embodiment discussed above, a skew-angle is used in magnetizing. In this third embodiment, a shape of a core is devised so that cogging torque can be reduced. FIG. 13 illustrates a core shape of a brush-less motor in accordance with the third embodiment. The brush-less motor differs from that of the first embodiment in the following point: In FIG. 13, a shape of core 33 has different open angle α at small teeth 36 on an edge of salient pole 35 from that of the first embodiment shown in FIG. 1. The other structures stay the same as those in the first embodiment.

Figure 14A:
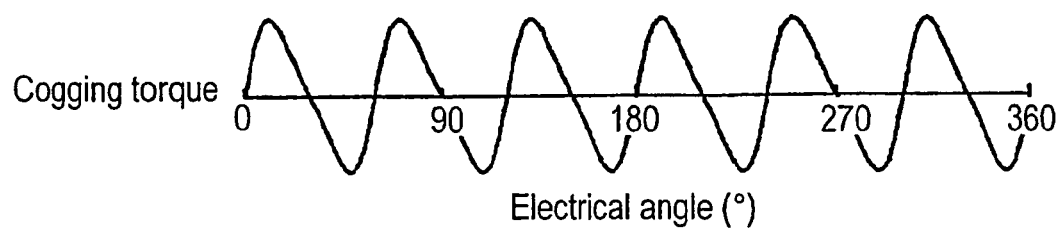
FIG. 14A shows a waveform of cogging torque when small teeth have an open angle of 120 degrees in electric angles in accordance with the third embodiment.

A change in open angle α at the small teeth greatly changes cogging torque. FIG. 14 show a waveform of cogging torque depending on a change in open angle α at the small teeth. FIG. 14A shows a waveform at open angle α=120 degrees in electrical angles, FIG. 14B shows at 150 degrees, and FIG. 14C shows at 180 degrees.

As shown in FIG. 14A, the cogging torque repeats the waveform six times during rotating angle 360 degrees in electrical angles (60 times for a mechanical angle of 360 degrees.) This number agrees with the least common multiple "60" of the number of salient poles "6" and the number of magnetic poles "20". This is not a particular phenomenon to the third embodiment, but can be generally seen in brush-less motors employing the vernier structure. In other words, cogging torque, having a cycle consistent with the least common multiple of a number of salient poles and a number of magnetic poles, also occurs in the brush-less motor employing the vernier structure. This cycle is called hereinafter a basic cogging-torque cycle.

Figure 14B:
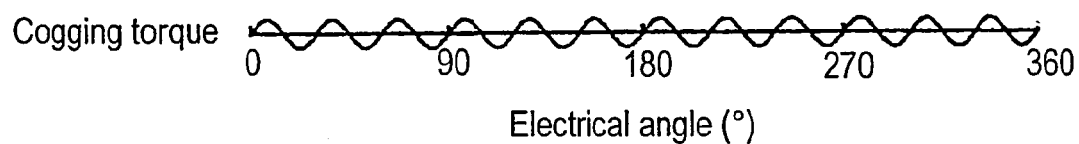
FIG. 14B shows a waveform of cogging torque when small teeth have an open angle of 150 degrees in electric angles in accordance with the third embodiment.
Figure 14C:
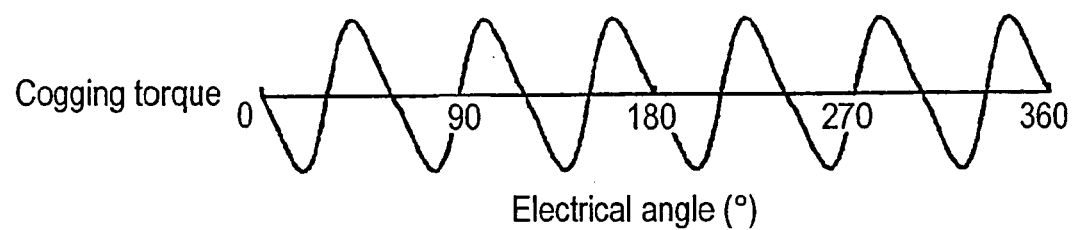
FIG. 14C shows a waveform of cogging torque when small teeth have an open angle of 180 degrees in electric angles in accordance with the third embodiment.

In the case of FIG. 14C, where open angle α of small teeth 6 is increased, the cycle and an absolute value of cogging torque are approx. equal to those in the case shown in FIG. 14A; however, the waveform in FIG. 14C has a reverse phase to that of FIG. 14A. On the other hand, in the case of open angle α is set at 150 degrees in electrical angles as shown in FIG. 14B, cogging torque, having a frequency of which cycle is two times of the basic cogging-torque cycle, occurs and an absolute value becomes substantially small.

FIG. 15 and FIG. 16A through FIG. 16D illustrate a reason of this phenomenon shown in FIG. 14B. In order to simplify the description, the following condition is considered: a border between N pole and S pole of magnet 31 shown in FIG. 15 is just arriving at edge-corner 6-1 of small tooth 36.

Figure 16A:
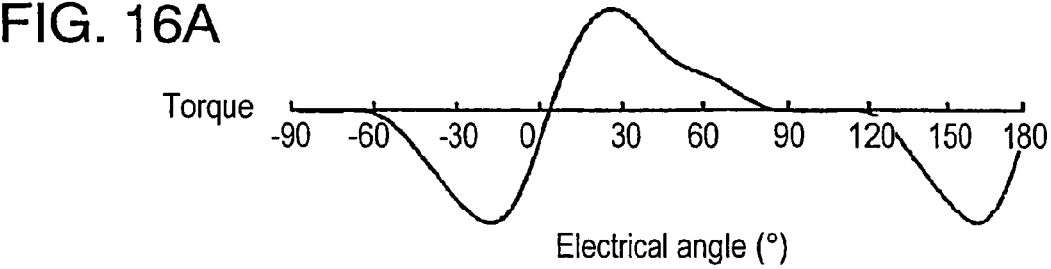
FIG. 16A shows a torque waveform occurring at small tooth edge 6-1 in accordance with the third embodiment.

In the status shown in FIG. 15, magnetic energy between magnet 31 and small tooth 36 changes, and the torque as shown in FIG. 16A occurs. The waveform of this torque approximates to zero when edge-corner 6-1 of small tooth 36 agrees with the border between N pole and S pole.

Figure 16B:
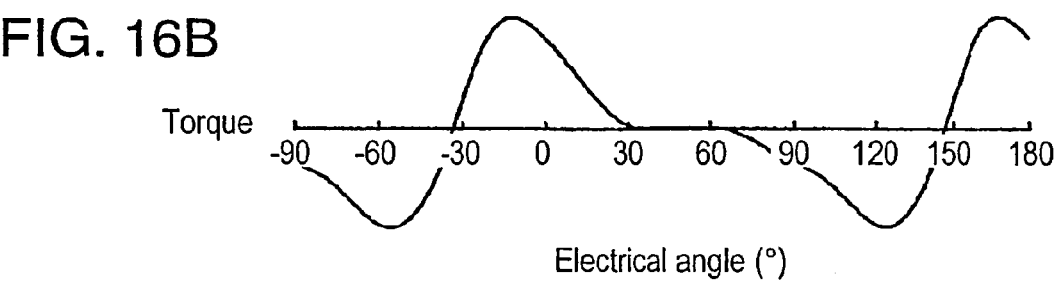
FIG. 16B shows a torque waveform occurring at small tooth edge 6-2 in accordance with the third embodiment.
Figure 16C:
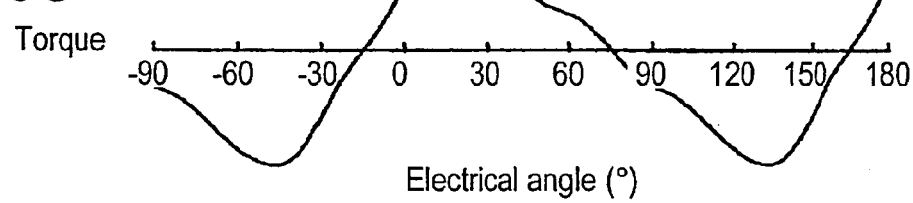
FIG. 16C shows a waveform synthesized from the waveforms shown in FIG. 16A and FIG. 16B.

In this case, at another edge-corner 6-2 of small tooth 36, torque also occurs in the same manner and its waveform approximates to zero when edge-corner 6-2 agrees with the border between N pole and S pole. The waveform of the torque at edge-corner 6-2 and that at edge-corner 6-1 are symmetric with respect to a point as shown in FIG. 16B. Setting open angle θ at 150 degrees in electrical angles makes the phases of the torque at edge-corners 6-1 and 6-2 different. Thus the respective torque cancel each other, so that a third component of the torque at small tooth 36 is completely removed as shown in FIG. 16C.

Figure 16D:
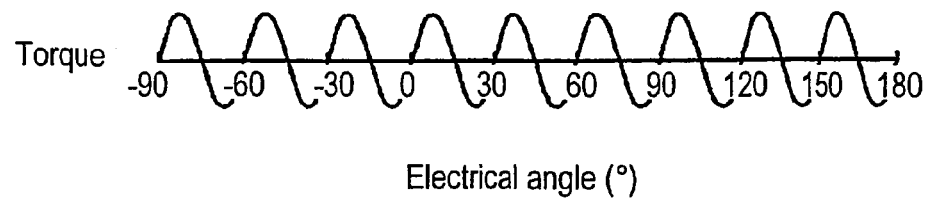
FIG. 16D shows a synthesized waveform of the entire motor in accordance with the third embodiment.

In the motor as a whole, a first, second, fourth and fifth components are cancelled by the torque, of which phases are different from each other by 120 degrees in electrical angles, occurring at other small teeth, and torque having sixth and onward components occurs as shown in FIG. 16D. In conclusion, cogging torque having a half period of the basic cogging-torque period occurs, and the absolute value of the cogging torque becomes smaller.

This third embodiment proves that the cogging torque is minimized at 150 degrees in electrical angles of the open angle of small teeth 6. In the same manner, when the open angle of the small teeth is 90 or 210 degrees in electrical angles, third components of the cogging torque occurring at both the edge-corners are removed, then the same phenomenon appears.

This third embodiment proves that the cogging torque is minimized at 150 degrees in electrical angles of the open angle of a small tooth. A slight deviation from 150 degrees is considered, e.g., when an open angle of a small teeth is 140 or 160 degrees in electrical angles, 50% of a third component of cogging torque occurring at the small teeth is removed. In the case of an open angle is 145 or 155 degrees in electrical angles, 74% of the third component thereof is removed. Thus it is preferable to set the open angle somewhere between 145 to 155 degrees, where the third component is reduced to as low as less than 25%, in order to obtain practical performance. The basic component of cogging torque is so much lowered that the cogging torque suppressed to a low level.

Figure 17A:
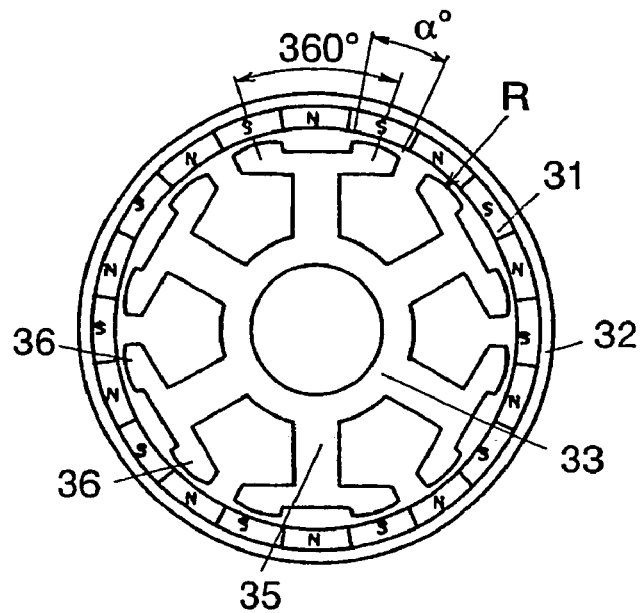
FIG. 17A illustrates a core shape where edges of the small teeth are rounded in another brush-less motor in accordance with the third embodiment.
Figure 17B:
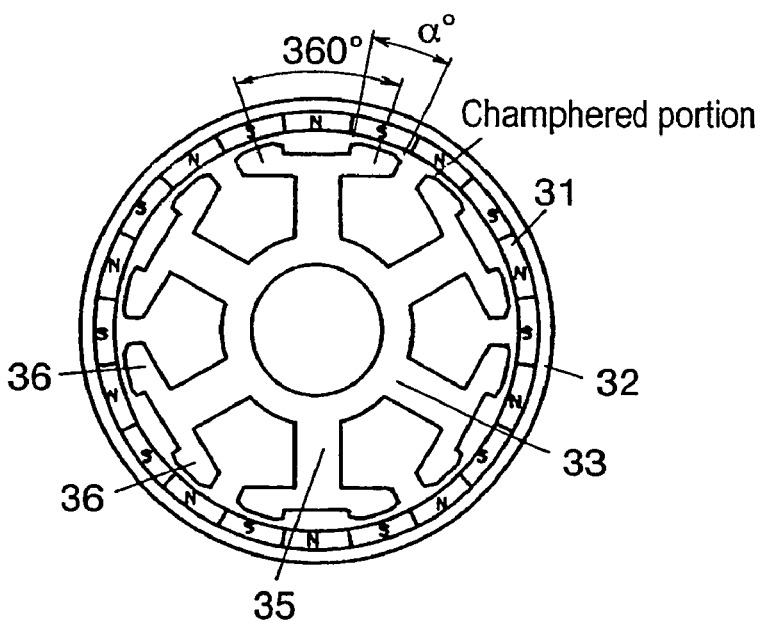
FIG. 17B illustrates a core shape where edges of the small teeth are chamfered in another brush-less motor in accordance with the third embodiment.

In the following three cases, the motor becomes a nearly-equal condition where an open angle of small teeth 36 becomes smaller from the view point of magnetic characteristics, and the cogging torque is minimized when open angle a of small teeth 36 is slightly larger (about 5 degrees in electrical angles) than the foregoing preferable range 145–155 degrees:

1. A shape of small tooth 36 is rounded with a smaller "R" (radius) than that of the core, as shown in FIG. 17B;
2. A shape of small tooth 36 is chamfered as shown in FIG. 17B; or
3. Influence such as magnetic saturation in the core is taken into consideration of a shape of small tooth 36.

Thus setting an open angle of a small tooth somewhere between 145 and 160 degrees, 85 and 100 degrees, or 205 and 220 degrees in electrical angles generates cogging torque having a half period of the basic cogging-torque period, and the absolute value of the cogging torque can be suppressed to a lower level.

However, when open angle α of small teeth is set somewhere between 85 and 100 degrees, a facing area between the small teeth and the magnet becomes smaller, so that a number of effective magnetic fluxes is reduced. On the contrary, when open angle α of small teeth is set somewhere between 205 and 220 degrees, the open angle becomes greater than a width of a magnetic pole. Thus non-effective magnetic fluxes occur, which increases iron loss. Since both of the factors, i.e., lowering the number of effective magnetic fluxes and increasing the iron loss, lower the efficiency, it is desirable to set an open angle of small teeth somewhere between 145 and 160 degrees in electrical angles.

Exemplary Embodiment 4

The third embodiment discussed above shows a method of reducing the cogging torque by changing an open angle of small teeth. In this fourth embodiment, a pitch of small teeth is focused as a method for reducing the cogging torque.

Figure 18A:
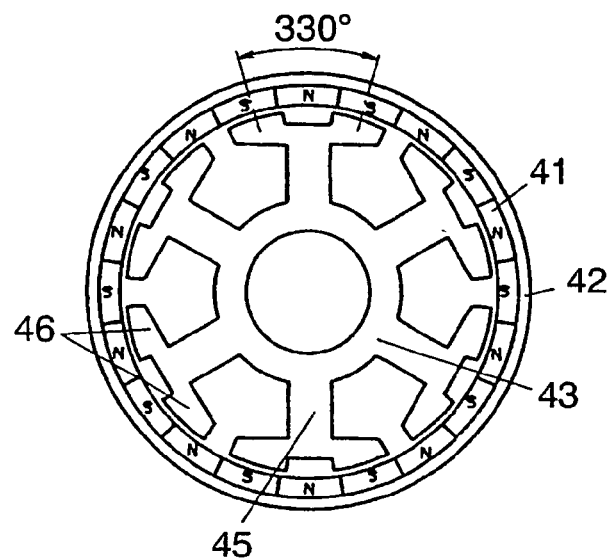
FIG. 18A through FIG. 18C are schematic views showing core shapes of brush-less motors in accordance with a fourth exemplary embodiment of the present invention.
Figure 18B:
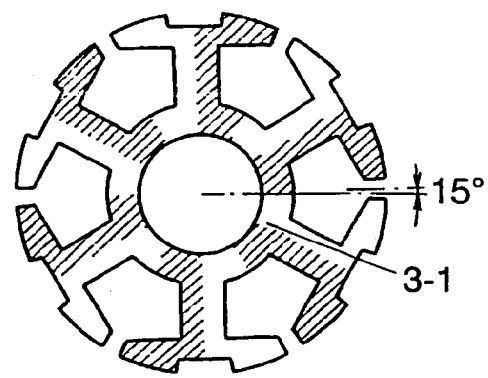
Figure 18C:
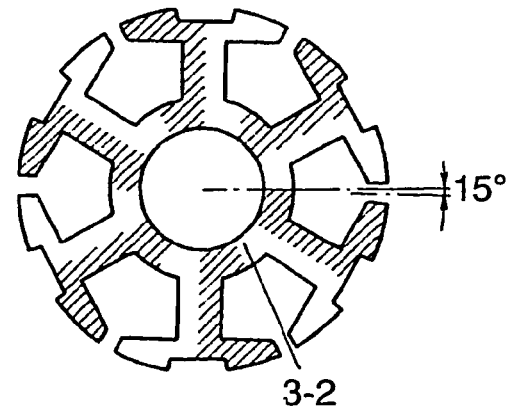
Figure 19A:
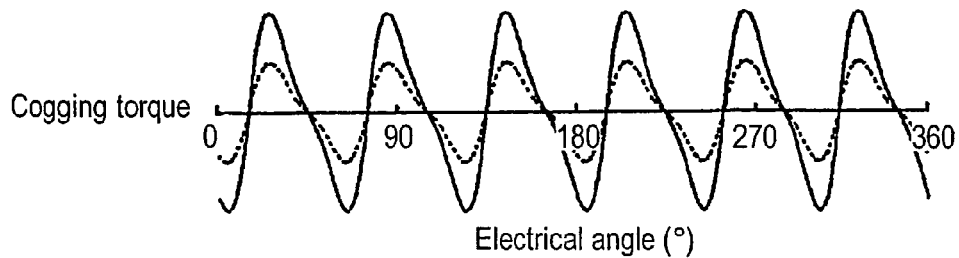
FIG. 19A shows a waveform of cogging torque occurring in core 3-1 in accordance with the fourth embodiment.
Figure 19B:
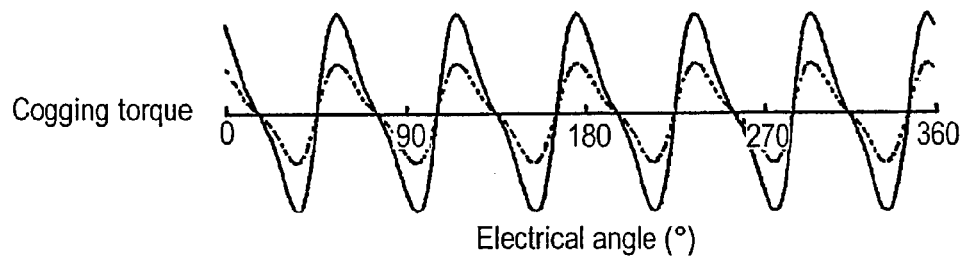
FIG. 19B shows a waveform of cogging torque occurring in core 3-2 in accordance with the fourth embodiment.
Figure 19C:
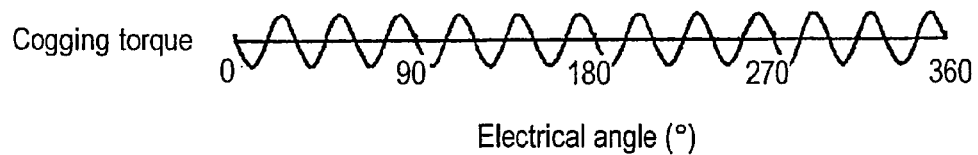
FIG. 19C shows a waveform of cogging torque occurring in a core in accordance with the fourth embodiment.

FIG. 18A through FIG. 18C illustrate a shape of a core of a brush-less motor in accordance with the fourth embodiment. FIG. 19A shows a waveform of cogging torque occurring at core 3-1 in the fourth embodiment. FIG. 19B shows a waveform of cogging torque at core 3-2. FIG. 19C shows a waveform of cogging torque occurring in the core used in the fourth embodiment.

In FIG. 18A, cylindrical magnet 41 is alternately and uniformly magnetized N pole and S pole at its inner wall, and back yoke 42 is rigidly mounted to its outer wall. Core 43 is made of silicon steel plates that have been punched by press and laminated axially. Core 43 includes six salient poles 45 equi-spaced from each other. Coils (not shown) are wound on each salient pole 45. Each salient pole 45 is toothed and has two small teeth 6 at its edges facing magnet 41, so that 12 small teeth 36 in total are formed.

The fourth embodiment differs from the first one shown in FIG. 1 in the following point: A pitch of small teeth 36 toothed on an edge of each salient pole shown in FIG. 1, i.e., in the first embodiment, is set at a width of two magnetic poles, namely, 360 degrees in electrical angles. In the fourth embodiment shown in FIG. 18A, a pitch of small teeth 46 is set at 330 degrees in electrical angles, which is smaller than that of the first embodiment. The reason why this shape is employed is described hereinafter.

The shape shown in FIG. 18A is formed by combining a shaded portion of core 3-1 shown in FIG. 18B with a shaded portion of core 3-2 shown in FIG. 18C. The shape of core 3-1 shown in FIG. 18B is the same as that of the first embodiment shown in FIG. 1, but it is rotated anti-clockwise by 15 degrees in electrical angles (1.5 degrees in mechanical angles.) The shape of core 3-2 shown in FIG. 18C is also the same as that of the first embodiment, but it is rotated, contrary to core 3-1, clockwise by 15 degrees in electrical angles (1.5 degrees in mechanical angles).

A reduction of cogging torque is described with reference to FIG. 19A through FIG. 19C. A solid line in FIG. 19A shows a waveform of cogging torque occurring at core 3-1. As already described in the first embodiment, cogging torque at core 3-1 shows 60 repetitions per rotation, i.e., 60 degrees in electrical angles (6 degrees in mechanical angles) per cycle because 20 magnetic poles and 6 salient poles of which least common multiple is 60. The shaded portions of core 3-1 correspond to just a half of the entire core, so that the cogging torque of the shaded portions becomes half and draws the waveform shown in FIG. 19A with a broken line.

In the same manner, the cogging torque at the shaded portions of core 3-2 shown in FIG. 18C draws the waveform shown in FIG. 19B with a broken line. A comparison of the cogging torque waveform shown in FIG. 19A with that shown in FIG. 19B reveals that the same torque sizes, the same cycles, and different phases in 180 degrees.

Thus the cogging torque occurring at core 43 in this fourth embodiment draws a waveform where the cogging torque at the shaded portions of core 3-1 shown in FIG. 18B is combined with that at the shaded portions of core 3-2 shown in FIG. 18C. Therefore, combination torque of the broken-line in FIG. 19A with the broken line in FIG. 19B draws the waveform shown in FIG. 19C where a first, third, fifth, and onward components of both the torque cancel with each other. The amplitude in FIG. 19C becomes substantially smaller than the original waveforms, and the period becomes a half of the original ones. As a result, the cogging torque of the brush-less motor in accordance with the fourth embodiment can be suppressed to a low level.

In the fourth embodiment, the shaded portions from the two core-shapes are selected according to the following method: the same number of shaded portions as that of non-shaded portions should be selected from the salient poles of which positional relation with a magnetic pole agrees with each other.

Any combination which does not follow the foregoing method results in no reduction of the cogging torque, and yet, balances of respective phases are lost, which sometimes degrades the characteristics of the motor.

Other shapes of the core than those shown in FIG. 18A through FIG. 18C can be available with an appropriate combination as far as the foregoing method is followed. Various core-shapes of different brush-less motors in accordance with the fourth embodiment are illustrated in FIGS. 20A–20C, FIGS. 21A–21C, FIGS. 22A–22C, FIGS. 23A–23C and FIGS. 24A–24D.

Figure 20A:
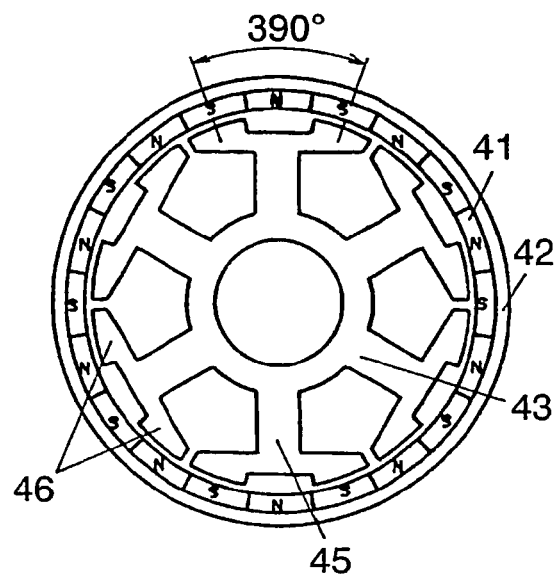
FIG. 20A through FIG. 20C are schematic views illustrating core shapes of other brush-less motors in accordance with the fourth embodiment.
Figure 20B:
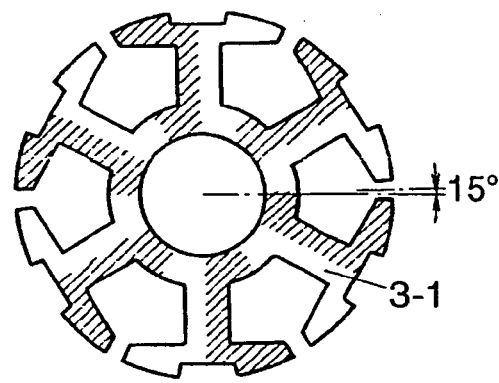
Figure 20C:
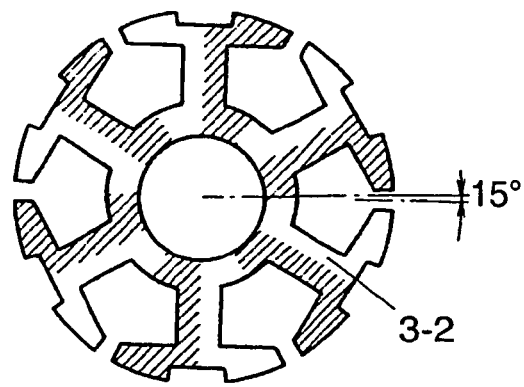
Figure 21A:
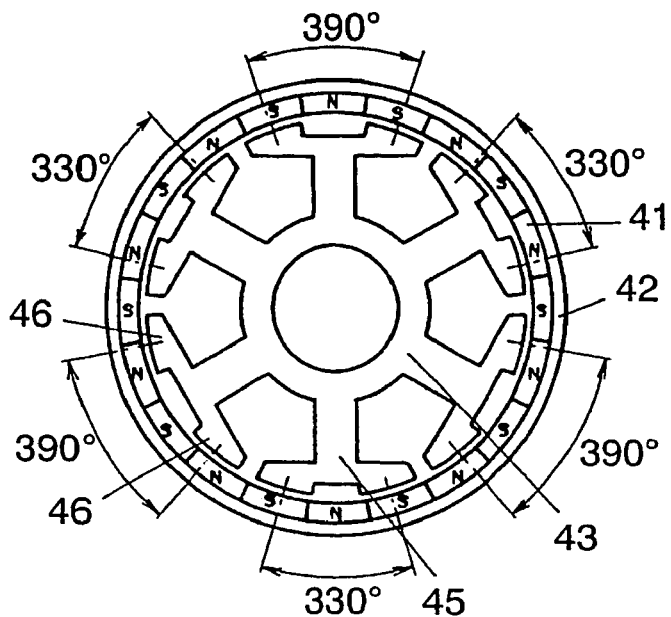
FIG. 21A through FIG. 21C are schematic views illustrating core shapes of still other brush-less motors in accordance with the fourth embodiment.
Figure 21B:
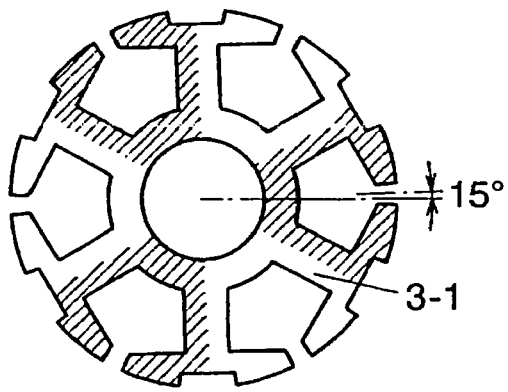
Figure 21C:
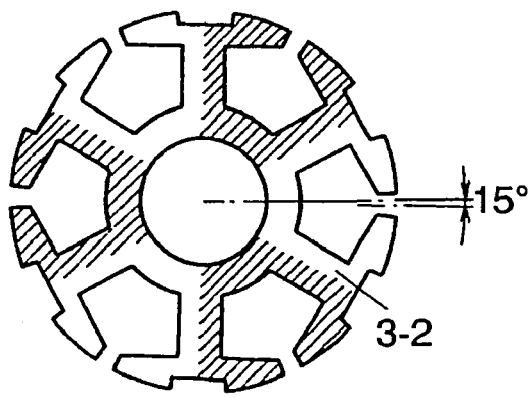
Figure 22A:
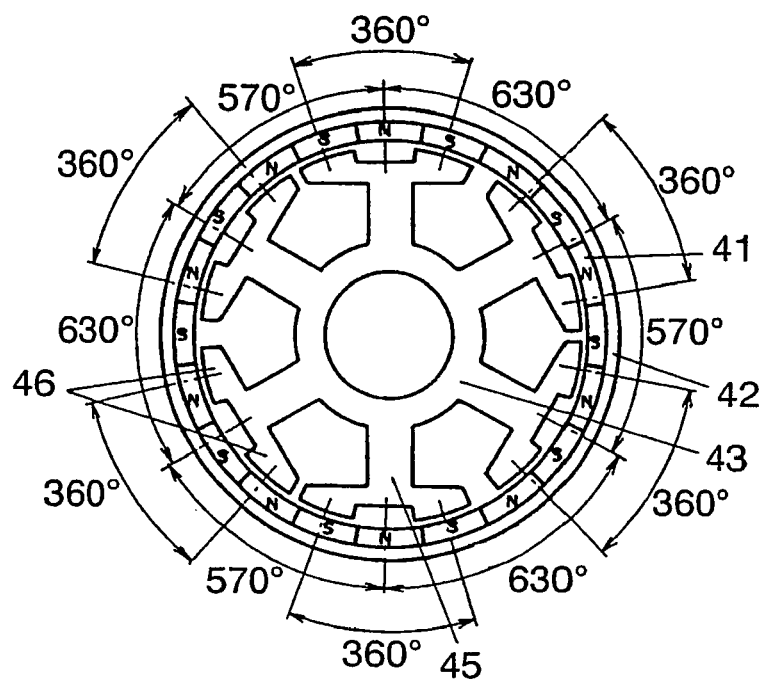
FIG. 22A through FIG. 22C are schematic views illustrating core shapes of yet other brush-less motors in accordance with the fourth embodiment.
Figure 22B:
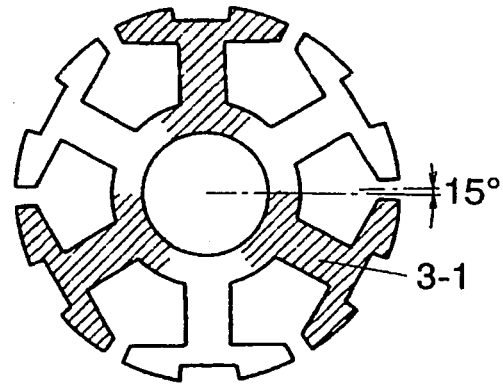
Figure 22C:
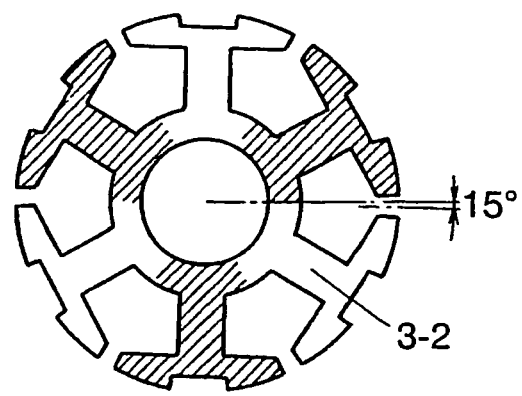
Figure 23A:
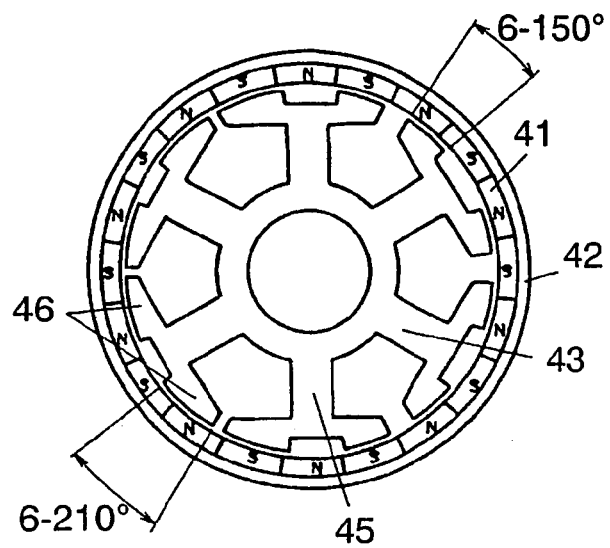
FIG. 23A through FIG. 23C are schematic views illustrating core shapes of further other brush-less motors in accordance with the fourth embodiment.
Figure 23B:
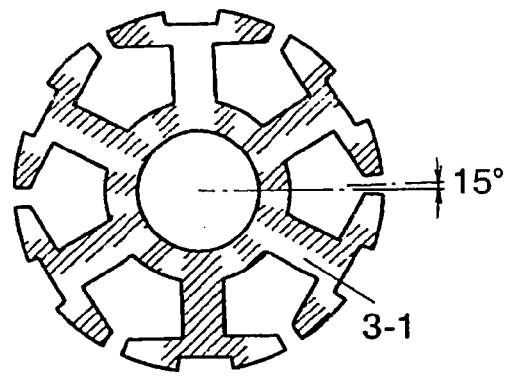
Figure 23C:
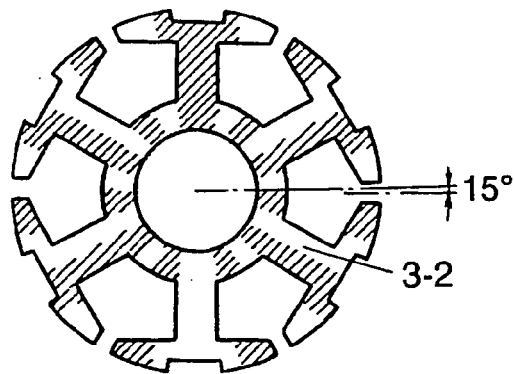

As shown in the respective drawings, various shapes can be available: FIGS. 20A–20C illustrate a core-shape of which teeth pitch is larger than 360 degrees in electrical angles, FIGS. 21A–21C illustrate a core shape where a teeth pitch larger than 360 degrees and a teeth pitch smaller than 360 degrees are alternately arranged. FIGS. 22A–22C illustrate a core-shape of which teeth pitch is 360 degrees; however, a pitch of salient edges is varied. FIGS. 23A–23C illustrates a core-shape of which open angles of the small teeth are different in right and left by a given degree. Other shapes than the foregoing descriptions are also available.

In the foregoing examples, the core-shapes different in a phase of 30 degrees in electrical angles are combined; however, it is not necessarily to have just 30 degrees difference, but it can be adjustable ±10 degrees so that a component of the basic cogging-torque cycle can be removed as much as by approx. 70%, which produces sufficient advantage.

Figure 24A:
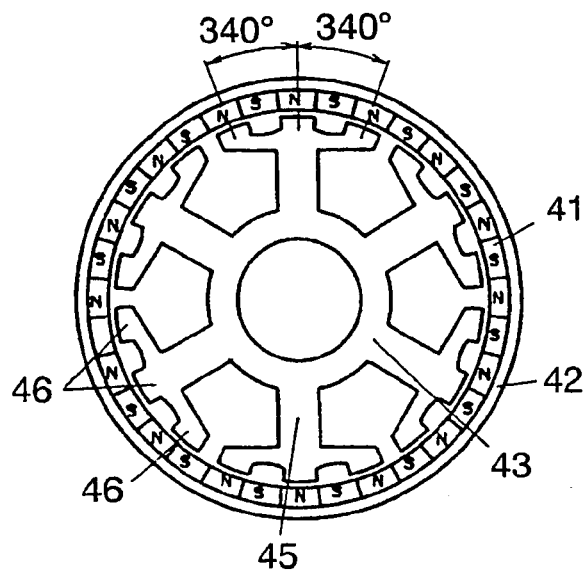
FIG. 24A through FIG. 24D are schematic views illustrating core shapes of still yet other brush-less motors in accordance with the fourth embodiment.
Figure 24B:
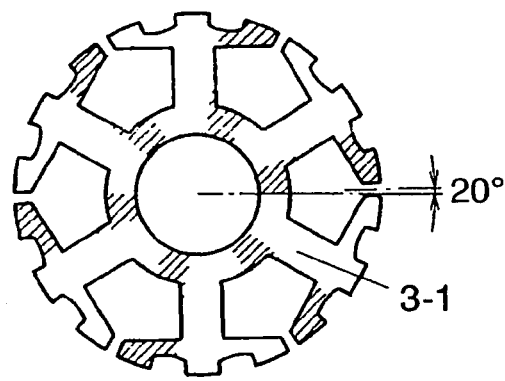
Figure 24C:
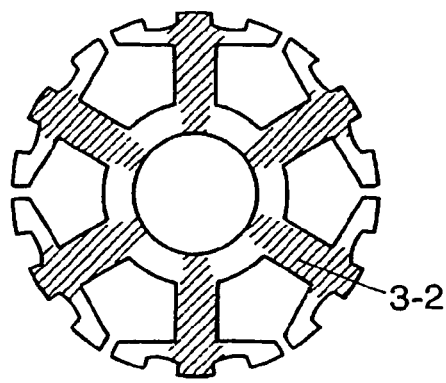
Figure 24D:
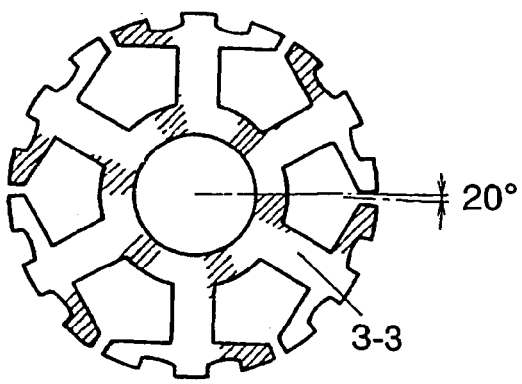

The foregoing examples show combinations of two different shapes of which respective cogging torque differ in phases by 180 degrees form each other. However, in the case of three small teeth being provided to each salient pole as shown in FIG. 24A, the cogging torque can be also reduced by combining core-shapes whose phases are different from each other in 20 degrees in electrical angles.

Thus it can be concluded that a three-phase brush-less motor, in general, can reduce its cogging torque with the following structure: assuming a number of small teeth="n" per salient pole, "n" pieces of basic core-shapes that deviate from each other by (60/"n" degrees)±10% are combined appropriately. A pitch of the small teeth is desirably smaller than 360 degrees as shown in FIG. 18A and FIG. 24A, though this has not been detailed in the foregoing descriptions.

In more general in the case of the three-phase brush-less motor, assuming a number of small teeth provided to one salient pole is "n", and a pitch of the small teeth is β degrees in electrical angles, then satisfactory of the following equation allows a greater space between adjacent salient poles, suppresses magnetic interference between the salient poles, and improves a work of winding the coils:

$\beta=360-(60/n\pm10\%)$

In the case of open angles of right and left being different by a given degree as shown in FIG. 23A, magnetic attraction between the core and the magnet differs in the right and left, so that the rotor is always urged to the bearing in a constant direction. Therefore, when an oil-impregnated sintered bearing is used, which allows clearance between the shaft and the bearing, rattle of the shaft can be suppressed and rotating accuracy can be improved.

The foregoing third and fourth embodiments describe the methods of reducing cogging torque by devising shapes of the cores. If the skewed-magnetization demonstrated in the second embodiment is combined with the third or fourth embodiment, the cogging torque can be further reduced.

In the second embodiment previously demonstrated, skew-angle θ is set to substantially agree with the basic cogging-torque cycle. However, in the third and fourth embodiments, first components of respective cogging torque are substantially removed, so that the cogging torque can be reduced to a satisfactory level with only a half of the skew-angle.

In other words, assuming a number of magnetic poles of a magnet is "p" and a number of salient poles of the core is "z", then skew-angle θ is set to satisfy the following equation, so that a reduction of the cogging torque can be compatible with an improvement of the volumetric efficiency of the motor:

$\theta=180/k\pm10\%$ where "k" is the least common multiple of "p" and "z".

Exemplary Embodiment 5

Figure 25A:
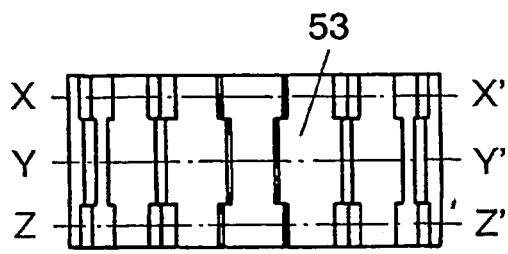
FIG. 25A shows a core shape of a brush-less motor in accordance with a fifth exemplary embodiment of the present invention.
Figure 25B:
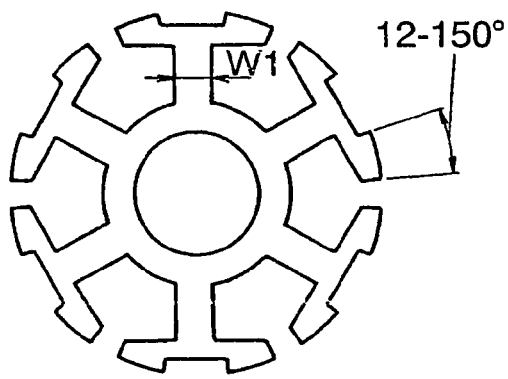
FIG. 25B is a sectional view taken along lines x–x' and z–z' in FIG. 25A.
Figure 25D:
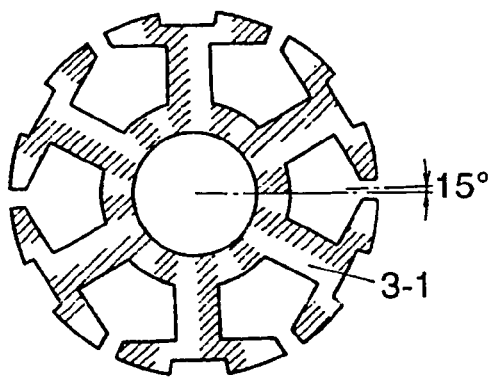
FIG. 25D and FIG. 25E show basic core-shapes of the brush-less motor shown in FIG. 25A.
Figure 25C:
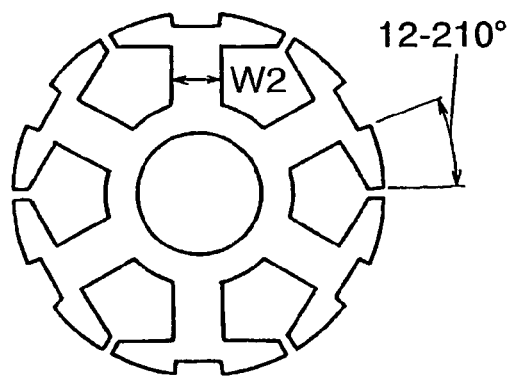
FIG. 25C is a sectional view taken along line y–y' in FIG. 25A.
Figure 25E:
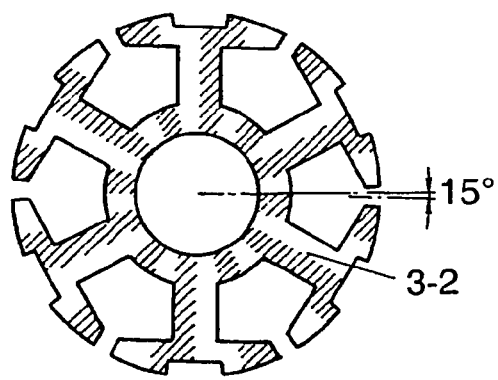
Figure 26:
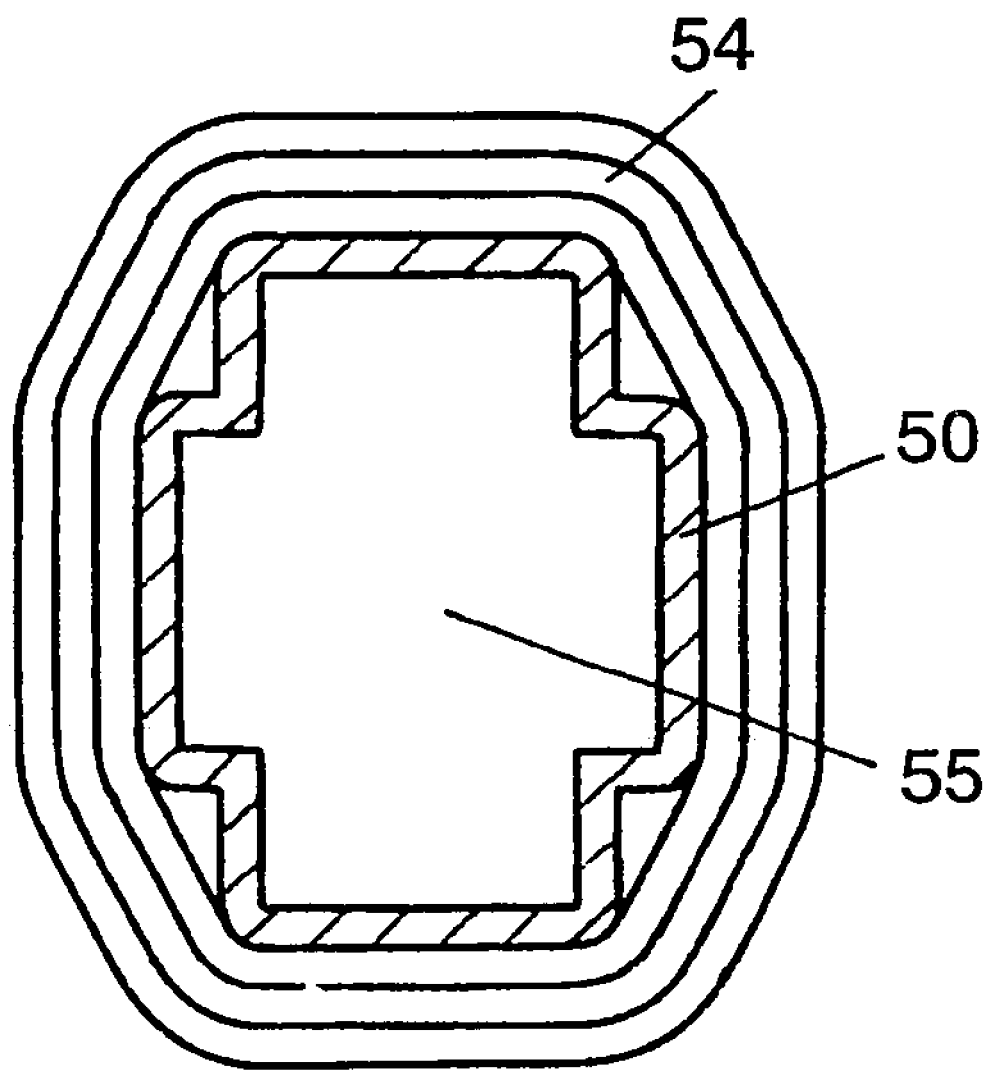
FIG. 26 is a sectional view of a salient pole of a core in accordance with a fifty exemplary embodiment of the present invention.

FIG. 25A shows a core shape of a brush-less motor in accordance with the fifth exemplary embodiment of the present invention. FIG. 25B is a sectional view taken along lines x–x' and z–z' in FIG. 25A. FIG. 25C is a sectional view taken along line y–y' in FIG. 25A. FIG. 25D and FIG. 25E show basic core-shapes of the brush-less motor shown in FIG. 25A. FIG. 26 is a sectional view of a salient pole of the core used in the fifth exemplary embodiment.

In the foregoing fourth embodiment, the focus falls on a sectional view of the core, and a method of reducing the cogging torque is devised. In this fifth embodiment, a sectional shape is divided along the axial direction, so that the cogging torque is reduced.

As shown in FIGS. 25A–25C, core 3 is formed of an upper, a middle and a lower sections. Core-shapes of the upper and lower sections are the same, and as shown in FIG. 25B, an open angle of all 12 small teeth is 150 degrees in electrical angles. A core-shape of the middle section has an open angle of 210 degrees in electrical angles at all 12 small teeth as shown in FIG. 25C.

Besides the open angles of the small teeth, the core in accordance with the fifth embodiment has narrower width "w1" of the coil-wound parts on salient poles at the upper and lower sections than width "w2" of the coil-wound part at the middle section.

The core of the fifth embodiment is structured basically in the same way as that of the fourth embodiment.

The shape of the upper and lower sections of core 53 shown in FIG. 25B is constructed by combining the shaded portions of core 3-1 and core 3-2 shown in FIG. 25D and FIG. 25E. The shape of the middle section of core 53 shown in FIG. 25C is constructed by combining the portions other than the shaded portions of core 3-1 and core 3-2 shown in FIGS. 25D and 25E.

Further in core 53, regarding a width of a coil-wound part of a salient pole, width "w1" of the upper and lower sections is narrower than width "w2" of the middle section in accordance with the open angle of the small teeth. Because the upper and lower sections have a small open angle of the teeth and little amount of magnetic flux passing through the teeth, so that the narrower widths of the coil-wound parts do not adversely affect the magnetic characteristics.

Figure 37:
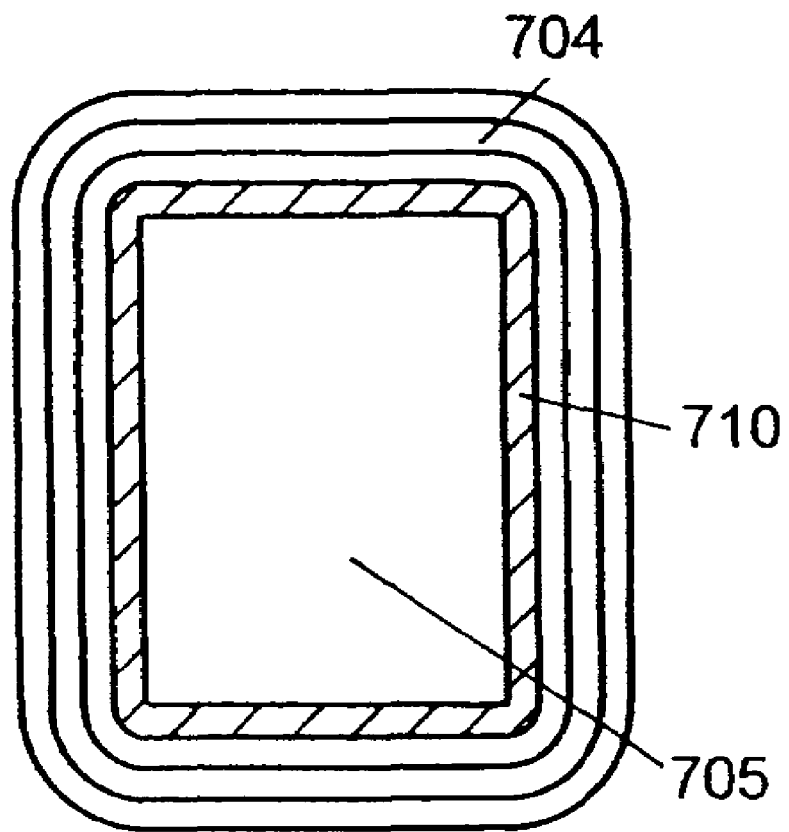
FIG. 37 shows a sectional view of a core's salient pole in accordance with a seventh conventional example.

On the other hand, these narrower coil-wound parts produce the following advantage: FIG. 26 shows a sectional view of the coil-wound part of a salient pole used in the fifth embodiment. FIG. 37 shows, for a comparison purpose, a sectional view of a coil-wound part of a salient pole of a seventh conventional example of a brush-less motor, in which the coil-wound part has a constant width. In this fifth embodiment shown in FIG. 26, core 55 is provided with insulating film 50 and coil 54 is wound thereon. On the other hand, in the seventh conventional example shown in FIG. 37, core 705 is provided with insulating film 710 and coil 704 is wound thereon.

A comparison of the case shown in FIG. 26 with that in FIG. 37 proves that the case in FIG. 26 uses a shorter coil-length per turn than the case shown in FIG. 37. Therefore, when coils of the same diameter are wound, a lower coil resistance is expected in the case shown in FIG. 26, so that volumetric efficiency of the motor is increased. Further, coil 54 forms a pentagon that distributes pressure applied to core edges to six spots, therefore, a thinner insulating film than the case shown in FIG. 37 can maintain the equivalent insulating capacity. A thinner insulating film allows more coil-turns, thereby further increasing the volumetric efficiency of the motor.

Exemplary Embodiment 6

FIG. 27A through FIG. 27E are schematic views of core shapes of a brush-less motor in accordance with the sixth exemplary embodiment of the present invention.

In the foregoing fourth and fifth embodiments, a core is constructed by combining a corresponding number of basic core-shapes to a number of small teeth "n" per salient pole. A construction by combining a more number of basic shapes, although it becomes rather complicated, can further reduce the cogging torque.

Figure 27A:
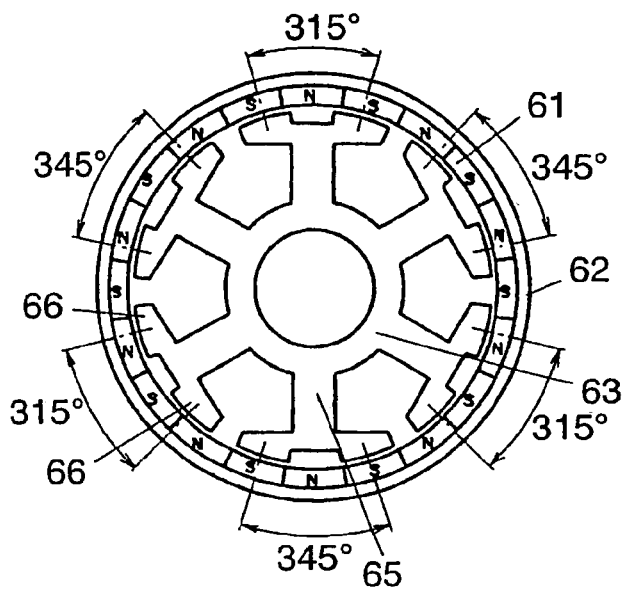
FIG. 27A through FIG. 27E are schematic views of core shapes of a brush-less motor in accordance with a sixth exemplary embodiment of the present invention.
Figure 27B:
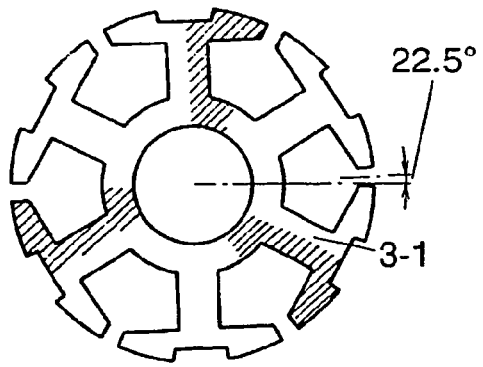
Figure 27D:
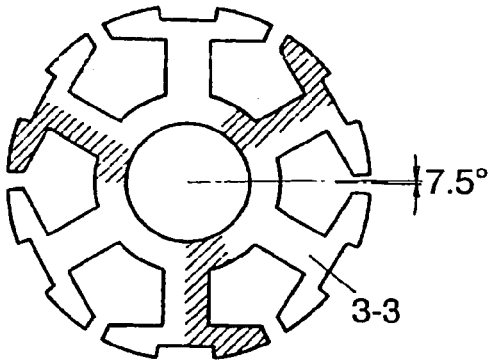
Figure 27C:
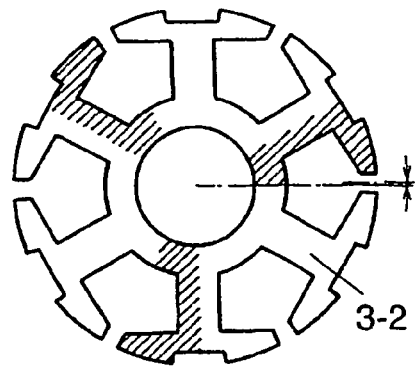
Figure 27E:
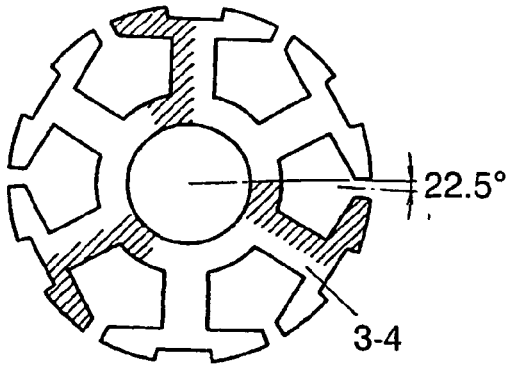

As shown in FIG. 27A, in a core of the sixth embodiment, a salient pole having a pitch of 315 degrees in electrical angles at small teeth and another salient pole having a pitch of 345 degrees are alternately placed. This shape is formed by combining shaded portions of four basic shapes shown in FIGS. 27B–27E. These four shapes differ in phase by 15 degrees in electrical angles from each other.

As such, a number of the basic shapes to be combined is increased, whereby a second component and onward components that could not be removed in the fourth or fifth embodiments can be cancelled, though the structure becomes rather complicated. As a result, the cogging torque can be further reduced.

In general, in the case of a three-phase brush-less motor, assuming that a total number of small teeth provided to salient poles per phase is "N", and a sectional shape of a core along an axial direction is formed by combining "N" pieces of basic core shapes. Those shapes are shifted by (60/"N" degrees in electrical angles)±10% from each other. This structure allows to provide a motor having substantially low cogging torque.

Exemplary Embodiment 7

FIG. 28A through FIG. 28D are schematic views of core shapes of a brush-less motor in accordance with the seventh exemplary embodiment of the present invention. In this seventh embodiment, the method of setting an open angle of the small teeth demonstrated in the third embodiment and the method of combining plural basic core-shapes demonstrated in the fourth and fifth embodiments are combined. This combined method can further reducing the cogging torque.

FIG. 28A illustrates a core shape of the seventh embodiment. As shown in FIG. 28A, core 73 of the seventh embodiment has a shape where respective salient poles 75 are toothed and provided with three small teeth per pole. Each small tooth 76 has a pitch of 350 degrees in electrical angles and has an open angle of 150 degrees in electrical angles.

This shape is formed by combining shaded portions of three core-shapes, shown in FIGS. 28B–28D, whose phases shift from each other by 10 degrees in electrical angles. In these shapes of three cores 3-1, 3-2, and 3—3, an open angle of small teeth is set at 150 degrees in electrical angles.

Figure 29A:
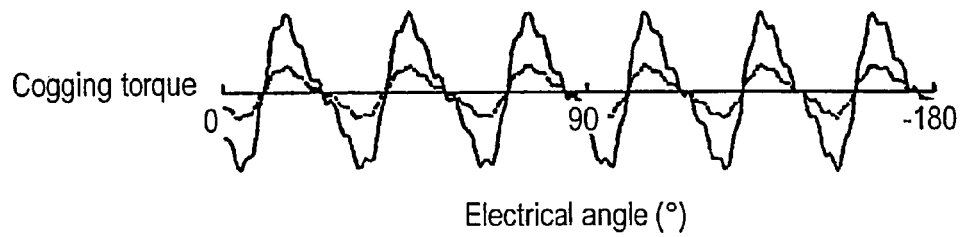
FIG. 29A shows a waveform of cogging torque occurring in core 3-1 in accordance with the seventh embodiment.
Figure 29B:
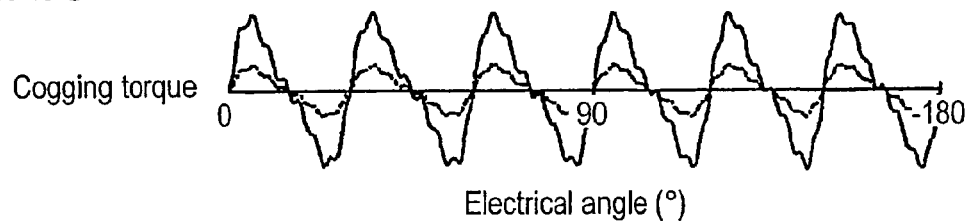
FIG. 29B shows a waveform of cogging torque occurring in core 3-2 in accordance with the seventh embodiment.
Figure 29C:
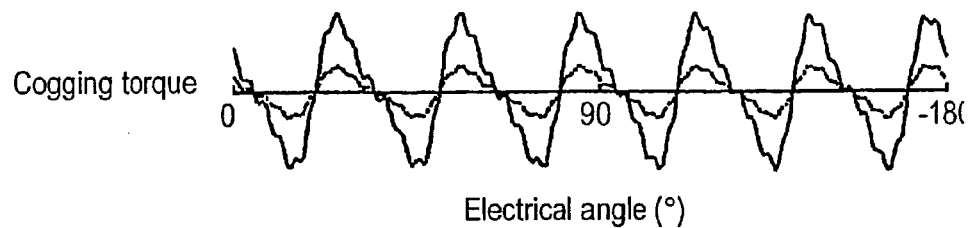
FIG. 29C shows a waveform of cogging torque occurring in core 3—3 in accordance with the seventh embodiment.

Reduction of the cogging torque in core 73 of the seventh embodiment is demonstrated with reference to FIGS. 29A–29D. The shapes of three cores 3-1, 3-2, and 3—3 have an open angle of 150 degrees at a salient pole originally. Therefore, as the solid lines in FIGS. 29A–29C show, the cogging torque having a half period (a period of 30 degrees in electrical angles) of the basic cogging-torque period is produced. This cogging torque also has a less absolute value.

Figure 29D:
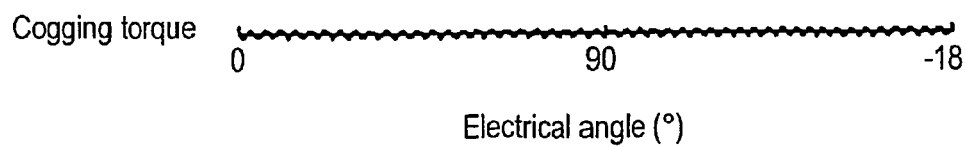
FIG. 29D shows a waveform of cogging torque occurring in a core in accordance with the fourth embodiment.

These three core-shapes are shifted phase by 10 degrees in electrical angles from each other, and the core-shape of the seventh embodiment is formed by combining ⅓ each of these three shapes. Therefore, the cogging torque generated by this core-shape cancels each other, so that the amplitude of the cogging torque becomes substantially small as shown in FIG. 29D and yet a period becomes less than ⅓ of the original waveform.

The core-shape having small cogging torque originally and a short period of the cogging torque is used in the third embodiment. The seventh embodiment employs this core-shape as a basic shape, and in addition, a half angular-shifted core-shape used in the fourth and fifth embodiment is combined therewith, whereby the cogging torque can be substantially reduced.

In general, a three-phase brush-less motor is preferably structured as follows: a number of small teeth provided to one salient tooth="n";

a sectional shape of a core along an axial direction has an open angle of 145–160 degrees in electrical angles at the small teeth provided to each salient pole, and such a core shape is used as a basic shape; and "n" pieces of the basic core shapes are combined and shifted from each other in a rotating direction by (30/"n" degrees)±10% to form a core shape.

Further as shown in FIG. 28A, a pitch of the small teeth is set at less than 360 degrees in electrical angles. In general, a number of small teeth provided to one salient pole="n", a pitch of the small teeth=β degrees in electrical angles, and β is set to satisfy the following equation. Then a space between adjacent salient poles can be larger, magnetic interference between the salient poles can be suppressed, and a work of winding coils can be done efficiently:

$$\theta=360-(30/n\pm10\%)$$

According to the first embodiment through the seventh embodiment, the volumetric efficiency of a motor can be more than twice, and a downsized motor maintaining the same characteristics can be provided. If a size is kept as a conventional motor, an output can be substantially increased, so that an apparatus using this motor can improve its performance.

Exemplary Embodiment 8

Figure 30:
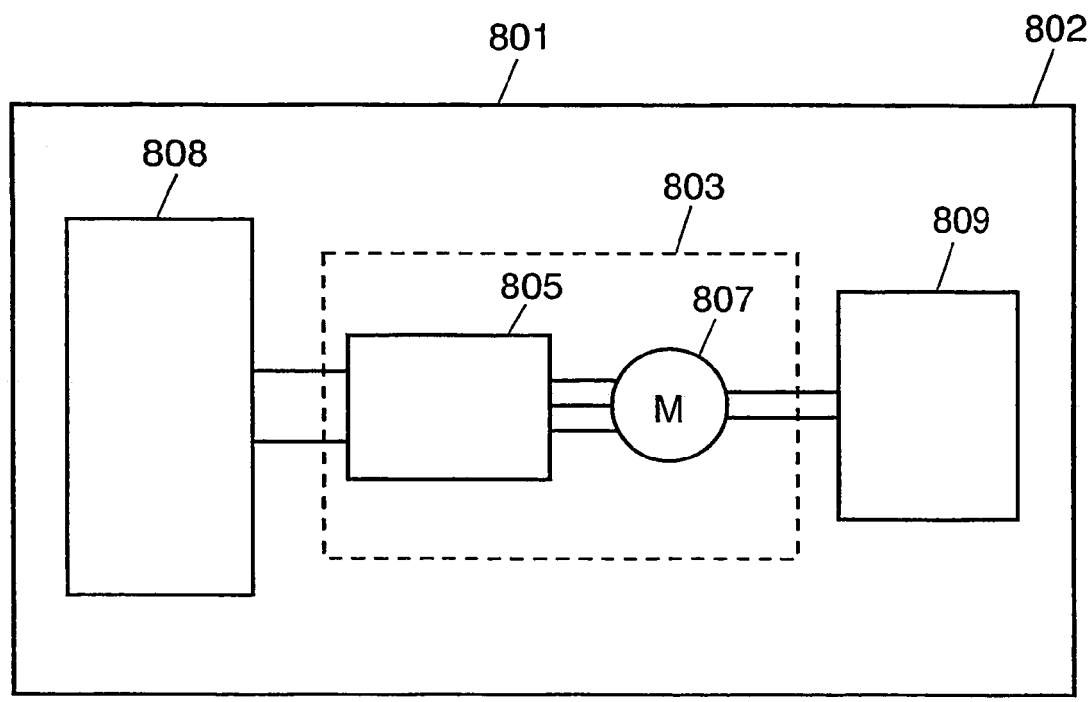
FIG. 30 is a schematic view of various apparatuses in accordance with an eighth exemplary embodiment of the present invention.
Figure 31A:
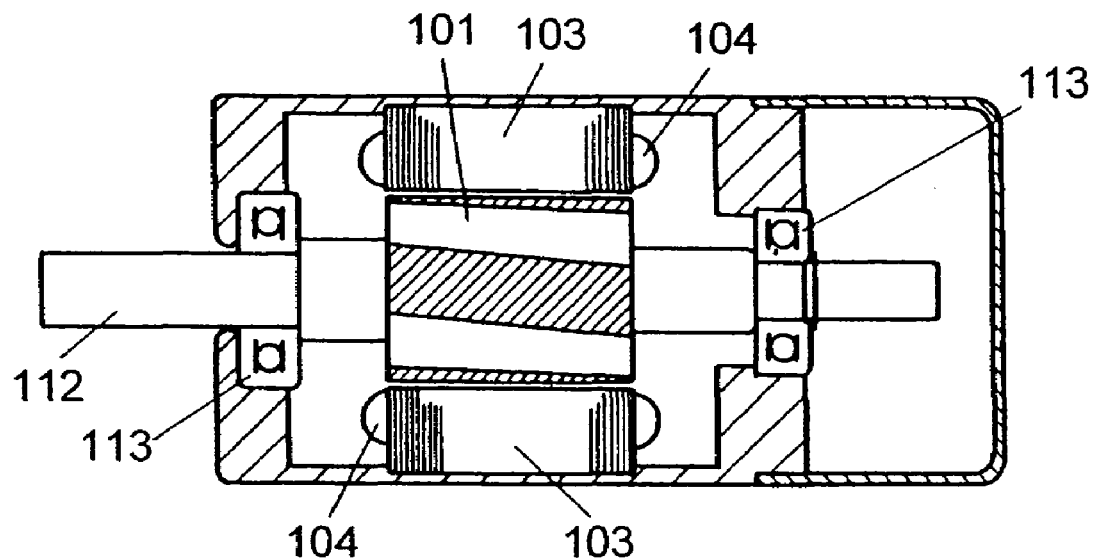
FIG. 31A is a sectional view of a first conventional example of a brush-less motor taken along an axial line.
Figure 31B:
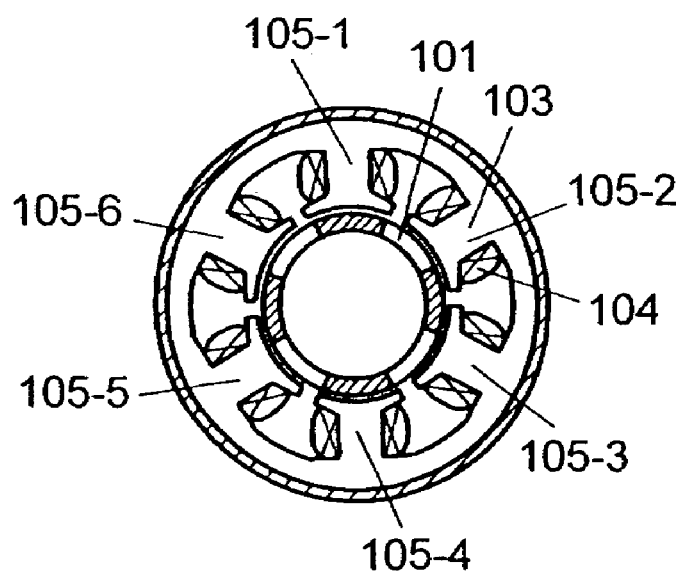
FIG. 31B is a sectional view of the brush-less motor shown in FIG. 31A taken along a vertical line to the axial direction.
Figure 32A:
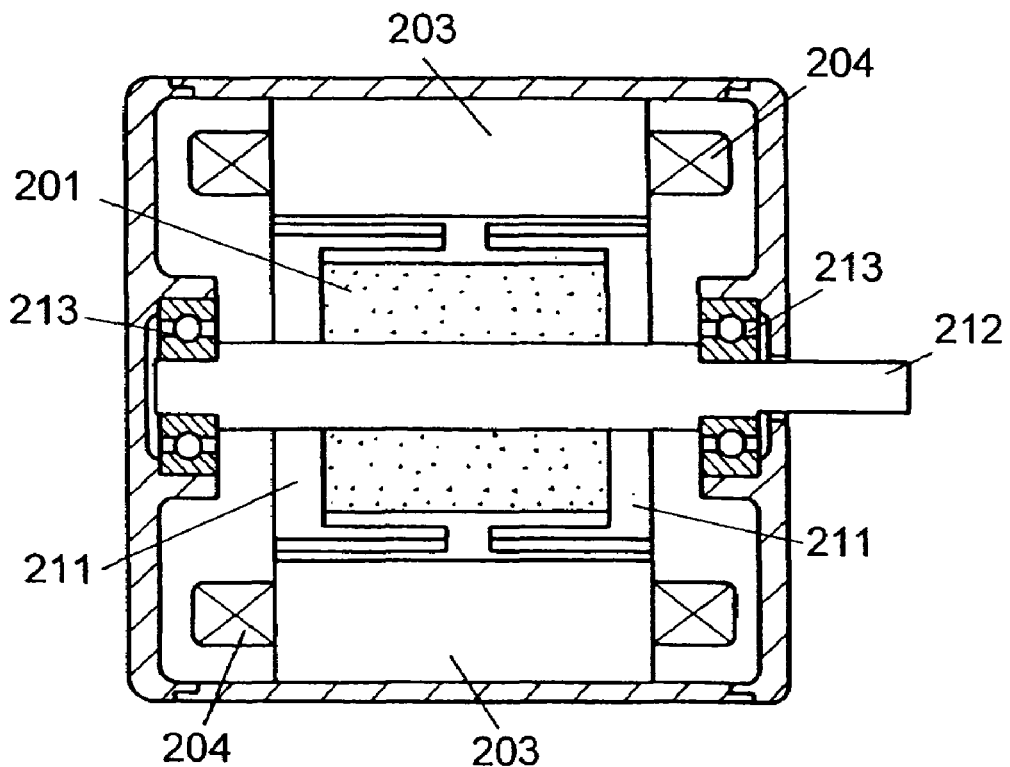
FIG. 32A is a sectional view of a second conventional example of an HB-type stepping motor taken along an axial line.
Figure 32B:
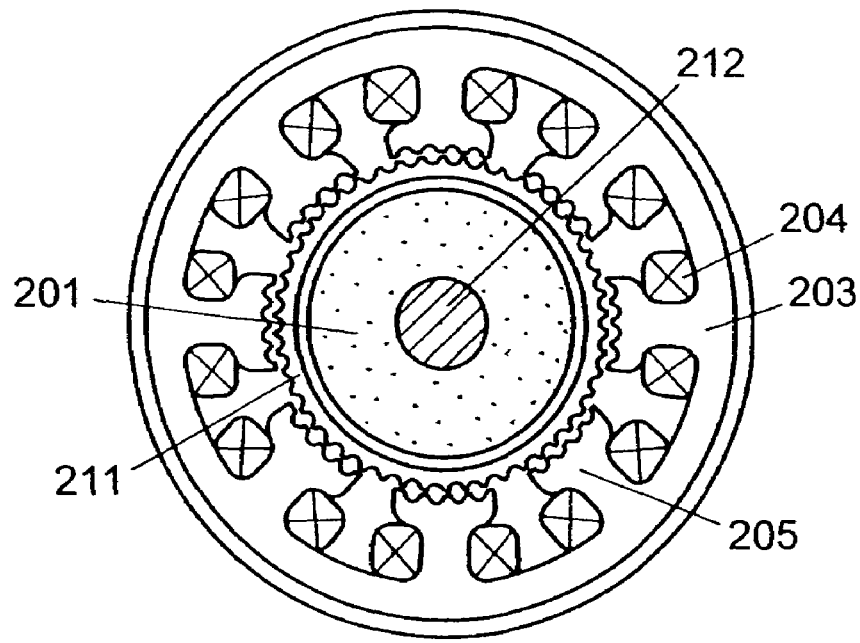
FIG. 32B is a sectional view of the HB-type stepping motor taken along a vertical line to the axial direction.
Figure 33A:
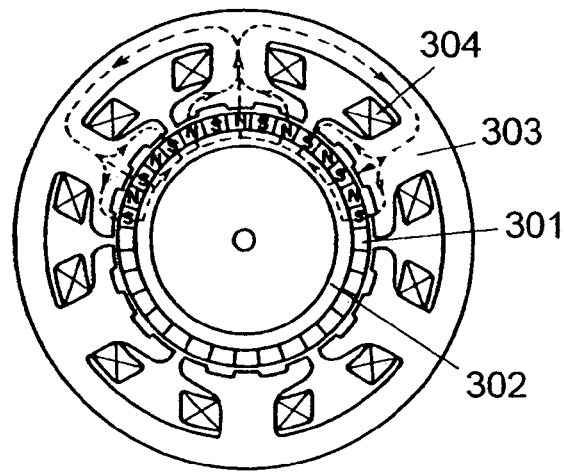
FIG. 33A is a schematic view illustrating a structure of a magnetic circuit of a three-phase stepping motor in accordance with a third conventional example.
Figure 33B:
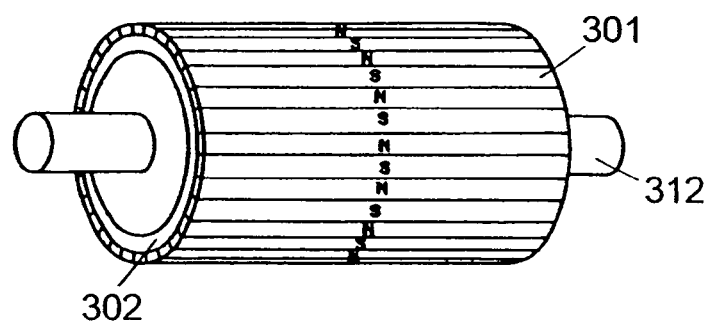
FIG. 33B shows a rotor structure of the three-phase stepping motor shown in FIG. 33A.
Figure 34:
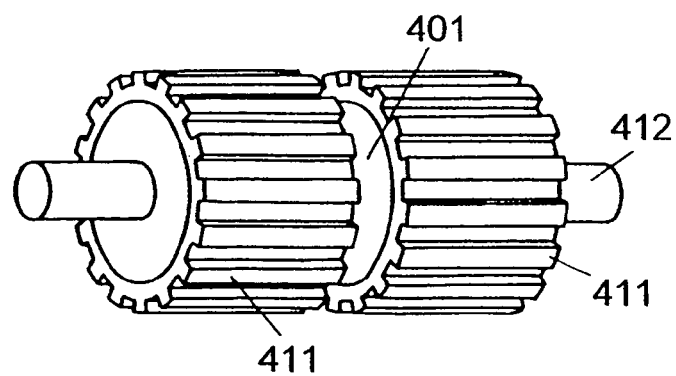
FIG. 34 shows a rotor structure of an HB-type stepping motor in accordance with a fourth conventional example.

FIG. 30 is a schematic view of various apparatuses in accordance with the eighth exemplary embodiment of the present invention. In FIG. 30, apparatus 801 comprises the following elements:

housing 802;
motor 807 mounted to housing 802;
driver 805 for driving motor 807;
power supply 808 for powering driver 805; and
load 809 such as a mechanical section to be driven by motor 807.

Motor 807 and driver 805 form motor driving device 803. In apparatus 801, power supply 808 drives motor 807 via driver 805, and rotating torque is transferred to load 809 via an output shaft of motor 807. Any motor in accordance with the first through the seventh embodiments can be used as motor 807.

Several apparatuses in accordance with the eighth embodiment are demonstrated hereinafter. First, the brush-less motor of the present invention is employed in portable information terminals, portable mini-disc players and the like, so that those apparatuses can be downsized and light-weighted. Because the motor has become downsized and light-weighted though it maintains the same performance as the conventional one.

An employment of the brush-less motor of the present invention in driving sources of office automation apparatuses, home appliances and the like allows those apparatuses and appliances to operate at a higher speed as well as perform more functions without enlarging their bodies.

To be more specific, in the case of optical-media apparatuses, the brush-less motor of the present invention can be used, e.g., as a spindle motor that spins a CD-ROM disc, a DVD, an optical disc, or a mini-disc. The employment of this brush-less motor downsizes and light-weights those apparatuses.

The brush-less motor of the present invention can be used in an office automation apparatus, e.g., it is used as a drum-motor that spins a photo-conductor drum of a copying machine. The copying machine of the present invention thus can operate at a higher speed and performs more functions. In the case of laser beam printers, the brush-less motor of the present invention can be used as a polygon mirror scanner motor for laser scanning. This usage allows the printer to print copies more accurately and at a higher speed. In the case of hard-disc apparatuses, the brush-less motor of the present invention is used, e.g., as a spindle motor that spins a hard disc. This application allows those hard-disc apparatuses to read/write data at a higher speed.

An employment of the brush-less motor of the present invention in home appliances such as a fan-motor of a blower equipped in an indoor unit or an outdoor unit of air-conditioners allows the air-conditioner to increase its performance. Because the motor of the same size and weight as a conventional one can output more power.

An employment of the brush-less motor of the present invention in an actuator for driving rotary joints of robots allows an improvement of response of industrial robots, because the motor of the same size and weight as a conventional one can output more power. This employment thus can improve the present status of robots, i.e., a bipedal walking robot, to a robot closer to a human body and it can do more sophisticated performances such as running, jumping, or throwing.

The brush-less motor of the present invention can be used as a motor for driving wheels of vehicles such as fuel-cell powered vehicles or electric vehicles, so that the motor with the same characteristics can be downsized and light weighted. As a result, those vehicles per se can be light-weighted, which results in an improvement in traveling performance or fuel mileage. Since the motor can output sufficient power though it is in a compact body, the motor is suitable for an in-wheel motor (a motor is accommodated within the wheels).

The exemplary embodiments previously discussed prove that the present invention substantially improves the volumetric efficiency of a motor, and downsizes the motor maintaining a conventional performance, or increases efficiency and an output of the motor maintaining a conventional size.

An employment of this motor in apparatuses allows those apparatuses to be downsized or perform more functions.

INDUSTRIAL APPLICABILITY

The present invention substantially improves volumetric efficiency of a motor, and thus downsizes the motor maintaining a conventional performance, or increases efficiency and an output of the motor maintaining a conventional size. An employment of this motor in apparatuses allows those apparatuses to be downsized or perform more functions.

The invention claimed is:

1. A brush-less motor comprising:
   a rotor including a magnet magnetized alternately N pole and S pole in a rotating direction; and
   a core including a plurality of salient poles wound with a coil, and facing the magnet in a radial direction,
   wherein small teeth, having a pitch substantially corresponding to two poles of the magnet, are provided to the salient poles at a facing section to the magnet,
   wherein the rotor is driven to rotate by powering the coil responsive to a rotor position, and
   wherein the motor is a three-phase brush-less motor, and a sectional shape of the core along an axial direction is formed by combining "n" pieces of basic core-shapes shifting (60/n) degrees±10% in a rotating direction from each other, where "n" represents a number of small teeth per salient pole.

2. The brush-less motor of claim 1, wherein an equation of $\beta=360-(60/n\pm10\%)$ is satisfied, where β represents a pitch of the small teeth in electrical angles.

3. The brush-less motor of claim 1, wherein an open angle of the small teeth differs in left and right, and an angle difference is 60 degrees±10% in electrical angles.

4. An apparatus including a brush-less motor as defined in claim 1.

5. A brush-less motor comprising:
   a rotor including a magnet magnetized alternately N pole and S pole in a rotating direction; and
   a core including a plurality of salient poles wound with a coil, and facing the magent in a radial direction,
   wherein small teeth, having a pitch substantially corresponding to two poles of the magnet, are provided to the salient poles at a facing section to the magnet,
   wherein the rotor is driven to rotate by powering the coil responsive to a rotor position, and
   wherein the motor is a three-phase brush-less motor, and a sectional shape of the core along an axial direction is formed by combining "N" pieces of basic core-shapes shifting (60/N) degrees±10% in a rotating direction from each other, where "N" represents a number of small teeth provided to salient poles per phase.

6. An apparatus including a brush-less motor as defined in claim 5.

7. A brush-less motor comprising:
   a rotor including a magnet magnetized alternately N pole and S pole in a rotating direction; and
   a core including a plurality of salient poles wound with a coil, and facing the magnet in a radial direction,
   wherein small teeth, having a pitch substantially corresponding to two poles of the magnet, are provided to the salient poles at a facing section to the magnet,
   wherein the rotor is driven to rotate by powering the coil responsive to a rotor position, and
   wherein the motor is a three-phase brush-less motor, and a sectional shape of the core along an axial direction is formed by combining "n" pieces of basic core-shapes shifting (30/n degrees)±10% from each other in a rotating direction, where each one of the basic core-shapes has an open angle of 145–160 degrees at the small teeth provided to each one of the salient poles, where "n" represents a number of the small teeth per salient pole, and "degrees" are in electrical angles.

8. The brush-less motor of claim 7, wherein an equation of $\beta=360-(30/n\pm10\%)$ is satisfied, where β represents a pitch of the small teeth in electrical angles.

9. An apparatus including a brush-less motor as defined in claim 7.

* * * * *